United States Patent
Thomas et al.

(10) Patent No.: US 6,525,821 B1
(45) Date of Patent: *Feb. 25, 2003

(54) ACQUISITION AND REPLAY SYSTEMS FOR DIRECT-TO-DIGITAL HOLOGRAPHY AND HOLOVISION

(75) Inventors: Clarence E. Thomas, Knoxville, TN (US); Gregory R. Hanson, Clinton, TN (US)

(73) Assignee: UT-Battelle, L.L.C., Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,267

(22) Filed: Jan. 4, 2000

Related U.S. Application Data

(63) Continuation-in-part of application No. 08/873,252, filed on Jun. 11, 1997, now Pat. No. 6,078,392.

(51) Int. Cl.[7] .......................... G01B 9/021; G03H 1/02

(52) U.S. Cl. ............................................ 356/457; 359/7

(58) Field of Search ................................. 356/457–458

(56) References Cited

U.S. PATENT DOCUMENTS

| | | | |
|---|---|---|---|
| 4,094,011 A | 6/1978 | Nagao | 365/216 |
| 4,812,042 A | 3/1989 | Yokokura et al. | 356/348 |
| 5,299,035 A | 3/1994 | Leith et al. | 359/9 |
| 5,515,183 A | 5/1996 | Hashimoto | 359/9 |
| 5,877,873 A | 3/1999 | Bashaw et al. | 359/10 |
| 5,995,251 A | 11/1999 | Hesselink et al. | 359/30 |
| 6,078,392 A * | 6/2000 | Thomas et al. | 356/348 |

FOREIGN PATENT DOCUMENTS

| | | | |
|---|---|---|---|
| JP | 04040622 | 1/1992 | G03H/1/08 |
| WO | WO 98/57234 | 12/1998 | |

OTHER PUBLICATIONS

Volkl, E. et al, "Advanced Electron Holography: A New Algorithm For Image Processing and Standarized Quality Test For the FEG Electron Microscope", Ultramicroscopy 58, (1995) 97–103.

Volkl, E et al, "A Software Package for the Processing and Reconstruciton of Electron Holograms", Journal of Microscopy, vol. 180, pt 1, Oct. 1995, pp. 39–50.

Leith, E.N. "Reconstructed Wavefronts and Communication Theory", Journal of Optical Society of America, vol. 52 No. 10, Oct. 1962.

Gabor, D. et al, "Microscopy by Reconstructed Wave–Fronts", Research Laboratory, Aug. 1948, pp. 454–487.

(List continued on next page.)

*Primary Examiner*—Frank G. Font
*Assistant Examiner*—Phil Natividad
(74) *Attorney, Agent, or Firm*—Gray Cary Ware & Friedenrich, LLP

(57) ABSTRACT

Improvements to the acquisition and replay systems for direct-to-digital holography and holovision are described. A method of recording an off-axis hologram includes: splitting a laser beam into an object beam and a reference beam; reflecting the reference beam from a reference beam mirror; reflecting the object beam from an illumination beamsplitter; passing the object beam through an objective lens; reflecting the object beam from an object; focusing the reference beam and the object beam at a focal plane of a digital recorder to form an off-axis hologram; digitally recording the off-axis hologram; and transforming the off-axis hologram in accordance with a Fourier transform to obtain a set of results. A method of writing an off-axis hologram includes: passing a laser beam through a spatial light modulator; and focusing the laser beam at a focal plane of a photorefractive crystal to impose a holographic diffraction grating pattern on the photorefractive crystal. A method of replaying an off-axis hologram includes: illuminating a photorefractive crystal having a holographic diffraction grating with a replay beam.

28 Claims, 20 Drawing Sheets-

OTHER PUBLICATIONS

Leith E.N. et al., "Wavefront Reconstruction With Continuous–Tone Objects", Journal of the Optical Society of America, vol. 53 No. 12, Dec. 1963.

Leith E.N. et al., "Wavefront Reconstruction with Diffused Illumination and Three Dimensional Objects", Journal of the Optical Society of America, vol.54 No. 11, Nov. 1964.

Hetlingov L.O., et al., "Holographic Interferometry", Journal of Applied Physics, vol 37 No. 2, Feb. 1966.

Kujawinska M., "Digital Fringe Pattern Measurement Techniques", Interferogram Analysis.

DeVelis, J.B. et al., "Theory and Applications of Holography", (1967).

Jahoda, F.C. et al., "Fracional–Fringe Holographic Plasma Interferometry", Applied Optics, Aug. 1967, vol. 6 No. 8, pp. 1407–1410.

Jahoda, F.C. et al., "Holographic Interferometry Cookbook", Los Alamos Scientific Laboratory, Oct. 1972.

Rastogi, P.K., "Holographic Interferometry", Optical Science Center, University of Arizona, vol. 68 (1994).

Voelkl, E. et al., "The Extended Fourier Algorithm. Application in Discrete Optics and Electon Holography", High Temperature Materials Laboratory, Jul. 1994.

Invention of Holography: D. Gabor, Proc. Roy. Soc. London Ser. A A197, 459 (1949).

Invention of Sideband (Hetrodyne) Holography: E. Leith and J. Upatnieks, J. Opt. Soc. Am. 52, 1123 (1962) and J. Opt. Soc. Am. 53 1377 (1963).

Mathematical Treatise on Holography: J.B. Develis and G.O. Reynolds, *Theory and Application of Holography*, Addison–Wesley, Reading, MA, 1967.

Invention of Holographic Interferometry: L.O. Heflinger, R.F. Wuerker, and R.E. Brooks, J. Appl. Phys. 37, 642 (1966).

Discussion of Focused Holography (used for holographic interferometry): F.E. Jahoda, R.A. Jeffries and G.A. Sawyer, Appln. Opt. 6, 1407 (1967).

*Interferogram Analysis: Digital Fringe Pattern Measurement Techniques*, M. Kujawinska, (edited by D.W. Robinson and G.T. Reid), IOP Publishing Ltd., Bristol, England, 1993).

*Holographic Interferometry: Principles and Methods*, K. Creath and T. Kreis (edited by K. Rastogi), Springer–Verlag, New York, New York, 1994.

Papers by E. Voelkl on Fourier transform analysis of electron holography: E. Voelkl, L.F. Allard, and B. Frost, J. Microscopy 180, pt. 1, Oct., 1995, pp. 39–50.

E. Voelkl, L.F. Allard, A. Datye, B. Frost, Ultramicroscopy 58, (1995), pp. 97–103.

E. Voelkl, L.F. Allard, ICEM–13 (13th International Conference on Electron Microscopy), Jul., 17–22, 1994, Paris, France, Proceedings, p. 287.

* cited by examiner

1

ACQUISITION AND REPLAY SYSTEMS FOR DIRECT-TO-DIGITAL HOLOGRAPHY AND HOLOVISION

CROSS-REFERENCE TO RELATED APPLICATION

This application is a continuation-in-part under 35 U.S.C. § 120 of U.S. Ser. No. 08/873,252, filed Jun. 11, 1997, now U.S. Pat. No. 6,078,392 filed Jun. 20, 2000, the entire contents of which are hereby incorporated herein by reference as if fully set forth herein.

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corporation, and the Government has certain rights in this invention.

BACKGROUND OF THE INVENTION

1. Field of the Invention

The present invention relates generally to the field of holography. More particularly, the present invention relates to a direct-to-digital hologram acquisition and replay system (i.e., no film, no plates). In a preferred implementation of the present invention, the hologram acquisition is based on a charge coupled device (CCD) camera. The present invention thus relates to a holographic system.

2. Discussion of the Related Art

Traditional methods of holography have used film or holographic plates (glass plates with a photographic emulsion optimized for holography) to record the hologram.[1] Replay has only been possible using lasers (or in some cases white light) and the original recorded hologram or a duplicate of it, in an analog method. These analog methods are slow, cumbersome, and expensive.[4] There is also no way to reduce them to electronic signals that can be transmitted and replayed at another location. It is always necessary to send hard copy. Worse still, the time delay involved in processing the film prevents the use of holography and its variants in many situations. Even if the expense of the classical holographic system itself was tolerable, the time delay and low throughput caused by the necessity of processing the film, introduces expenses associated with the delay that are absolutely intolerable (e.g., a tire manufacturer cannot wait 45 minutes, or even two minutes, to know that a particular tire has a flaw in it).

Referring to FIG. 1, a classical side-band holography system recordation geometry is shown.[2-3] Light from a laser 110 is expended by a beam expander 120. After passing through a lens 130, the light is split into two components by a beamsplitter 140. The beamsplitter 140 can be, for example, 90% reflective. The reflected beam constituting an object beam 150 travels toward and is reflected by a mirror 160. The object beam 150 then travels toward an object 170. The object beam 150 is then incident upon a holographic plate 190.

Meanwhile, that portion of the light from lens 130 that is transmitted through the beamsplitter 140 constitutes a reference beam 180 that travels toward and is reflected by a mirror 200. The reflected reference beam is then incident upon the holographic plate 190.

More recently, holographic interferometry has been developed, albeit also as an analog method.[5] This has included the development of focused holography.[6-7]

Within this application several publications are referenced by superscripts composed of arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

SUMMARY OF THE INVENTION

Therefore, there is a particular need for a method for 1) recording holograms directly to a CCD (charged coupled device) camera or any other suitable video camera with a digital computer interface and then 2) storing the holograms to a digital storage medium (e.g., RAM, hard drive, tape, recordable CD, etc.). Significant features of an apparatus for implementing this method include the use of a very small angle between the reference beam and object beam and focusing the hologram on the image plane to simplify the image. Additionally, the invention includes 1) a method of displaying the hologram phase or amplitude on a two-dimensional display and 2) a method of replaying the holograms completely using an optically active crystal and lasers. In contrast, the prior art does not include a description of how to electronically (digitally) record an optical hologram, much less replay, or broadcast an optical hologram.

The improvements disclosed herein allow for higher quality, lower-noise digital hologram acquisition and replay. The improvements make use of variations in the geometry and optical components to allow the acquisition and analysis of high resolution holograms. In addition, improvements to the replay system have been made that allow writing of a digital grating (hologram) to a photorefractive crystal, and then the replay of that grating or hologram with a single laser beam.

One embodiment of the invention is based on an apparatus to record an off-axis hologram, comprising: a laser; an illumination beamsplitter optically coupled to said laser; an objective lens optically coupled to said illumination beamsplitter; an object optically coupled to said objective lens; a reference beamsplitter coupled to said laser; a reference mirror optically coupled to said reference beamsplitter; a beam combiner optically coupled to both said reference beamsplitter and said illumination beamsplitter; and a digital recorder optically coupled to said beam combiner, wherein a reference beam and an object beam are combined at a focal plane of said digital recorder to form an off-axis hologram, and said object beam and said reference beam constitute a plurality of substantially simultaneous reference and object waves. Another embodiment of the invention is based on a method of recording an off-axis hologram, comprising: splitting a laser beam into an object beam and a reference beam; reflecting said reference beam from a reference beam mirror; reflecting said object beam from an illumination beamsplitter; passing said object beam through an objective lens; reflecting said object beam from an object; focusing said reference beam and said object beam at a focal plane of a digital recorder to form an off-axis hologram; digitally recording said off-axis hologram; and transforming said off-axis hologram in accordance with a Fourier transform to obtain a set of results.

Another embodiment of the invention is based on an apparatus to write an off-axis hologram, comprising: a laser; a spatial light modulator optically coupled to said laser; a lens optically coupled to said spatial light modulator; and a photorefractive crystal optically coupled to said lens, wherein a write beam is focused at a focal plane of said photorefractive crystal by said lens to impose a holographic diffraction grating pattern on said photorefractive crystal. Another embodiment of the invention is based on a method of writing an off-axis hologram, comprising: passing a laser beam through a spatial light modulator; and focusing said laser beam at a focal plane of a photorefractive crystal to impose a holographic diffraction grating pattern on said photorefractive crystal.

Another embodiment of the invention is based on an apparatus to replay an off-axis hologram, comprising: a laser; and a photorefractive crystal optically coupled to said laser. Another embodiment of the invention method of replaying an off-axis hologram, comprising: illuminating a photorefractive crystal having a holographic diffraction grating with a replay beam.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification, wherein like reference numerals designate the same elements in the several views. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The reason that digital holography has not been developed until now is that the resolution of digital video cameras or cameras adaptable to digital media has, heretofore, not been good enough to record the very high spatial frequencies inherent in classical holograms. The invention combines several techniques that overcome this difficulty, and allow recording of holograms and all of their spatial frequencies up to the inherent holographic resolution of the recording camera for Fourier transform hologram analysis.

It was necessary to realize how to digitally record an optical hologram (and that it is a hologram). It was also necessary to realize that the Fourier transform techniques used in interferometry and electron holography could be used to analyze the hologram. It was also necessary to realize that mathematical addition of a plane wave to the digital hologram, and writing the resulting intensity function to an optically sensitive crystal would allow actual replay of the hologram at a different (and much larger) diffraction angle $\alpha$, than the angle used to create the original sideband hologram.

2. Detailed Description of Preferred Embodiments

Figure 2:
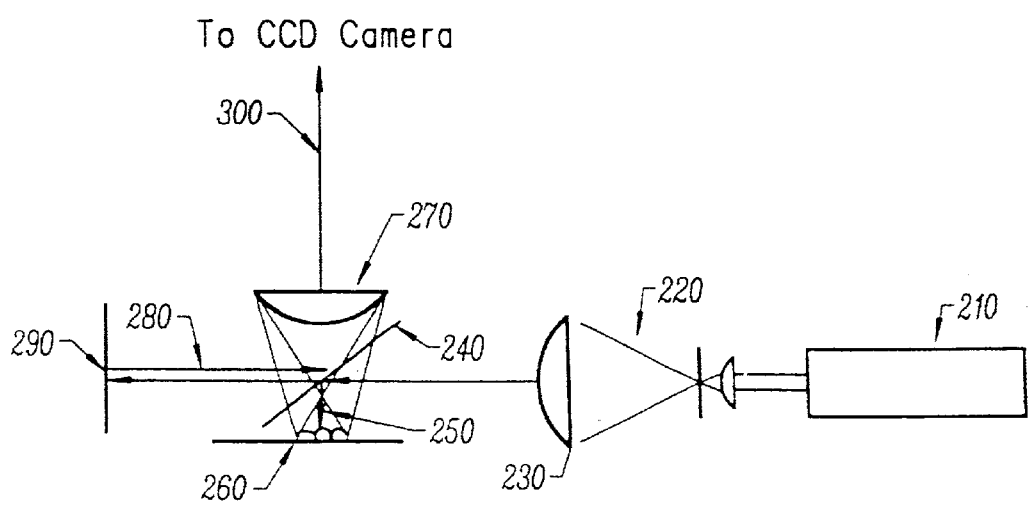
FIG. 2 illustrates a schematic view of a simple direct-to-digital holography system, representing an embodiment of the present invention.

Referring now to FIG. 2, a simple direct-to-digital holography system is shown to illustrate the hardware concepts that have been combined to allow digital recording and replay of holograms. Light from a laser 210 is expanded by a beam expander/spatial filter 220. The expanded/filtered light then travels through a lens 230. Then, the light travels to a beamsplitter 240. Beamsplitter 240 can be, for example, 50% reflective. Light that is reflected by the beamsplitter constitutes an object beam 250 which travels toward and object 260. A portion of the light reflected from the object 260 then passes through the beamsplitter 240 and travels toward a focusing lens 270. This light then travels to a charged coupled device (CCD) camera (not shown).

Meanwhile, that portion of the light from lens 230 that passes through beamsplitter 240 constitutes a reference beam 280. The reference beam 280 is reflected from a mirror 290 at a small angle. The reflected reference beam from mirror 290 then travels toward the beamsplitter 240. That portion of the reflected reference beam that is reflected by the beamsplitter 240 then travels toward the focusing lens 270. The reference beam from focusing lens 270 then travels toward the CCD camera. Together, the object beam from the focusing lens 270 and the reference beam from the focusing lens 270 constitute a plurality of simultaneous reference and object waves 300.

Figure 1:
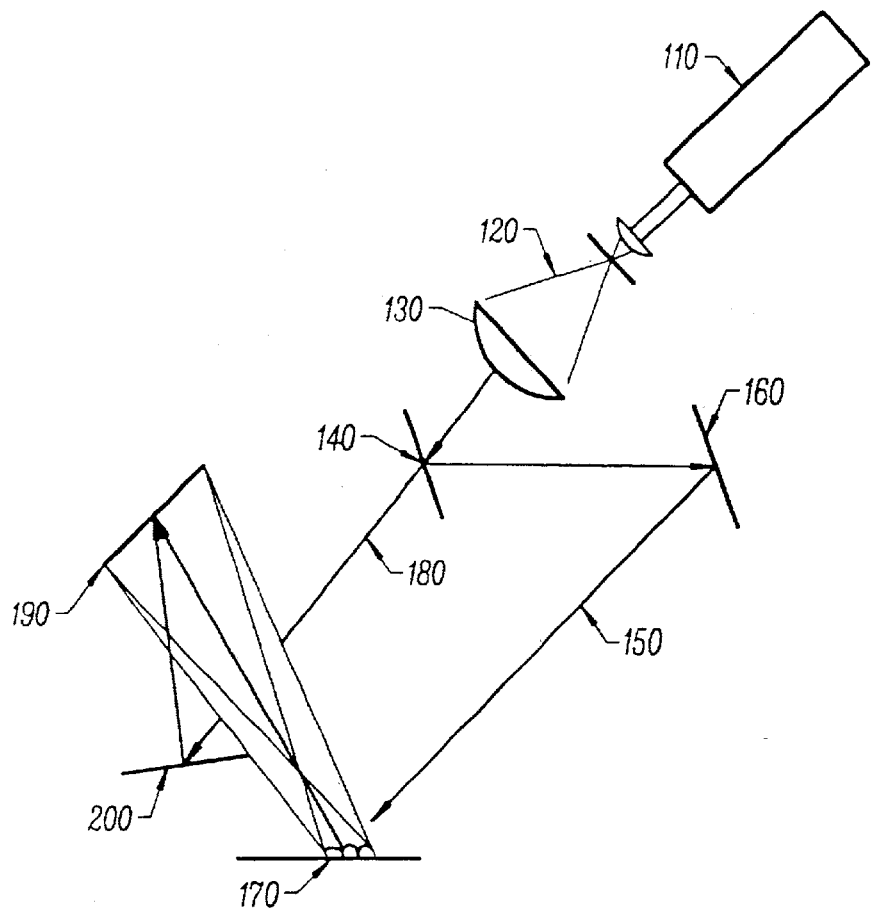
FIG. 1 illustrates a schematic view of a classical (Leith & Upatnieks) sideband holography system, appropriately labeled "PRIOR ART"

Comparing FIG. 2 to FIG. 1, it can be seen that at least the following differences allow a CCD camera to record the hologram, rather than using film or a photographic plate. 1) The invention uses a high resolution CCD (e.g., 1.4 million pixels), (CCD's with over 60 million pixels are already available). 2) The invention uses a "Michelson" geometry (the geometrical relationship of the beamsplitter, reference beam and the object beam to be combined at a very small angle (the reference beam mirror, and CCD resembles a Michelson interferometer geometry). This geometry allows the reference beam mirror to be tilted to create the small angle that makes the spatially heterodyne or sideband fringes for Fourier analysis of the hologram. 3) The invention uses a focusing lens to focus the object onto the focal plane of the CCD. This lens also provides magnification or demagnification, as desired, by using lenses of different focal length and adjusting the corresponding spatial geometry (e.g., ratio of object distance to image distance). The foregoing three factors allow direct to digital recording and replay of holograms when combined with Fourier transform software analysis methods known in the literature.[10-12]

The system is suitable for recording and replaying holographic images in real time or storing them for replay later. Since the holograms are digitally stored, a series of holograms can be made to create a holographic motion picture or the holograms can be broadcast electronically for replay at a remote site to provide holographic television (HoloVision). Since a hologram stores amplitude and phase, with phase being directly proportional to wavelength and optical path length, this direct to digital holography can also serve as an extremely precise measurement tool for verifying shapes and dimensions of precision components, assemblies, etc. Similarly, the ability to store the holograms digitally immediately provides a method for digital holographic interferometry. Holograms of the same object, after some physical change (stress, temperature, micromachining, etc.), can be subtracted from one another (direct subtraction of phase) to calculate a physical measurement of the change (phase change being directly proportional to wavelength). Similarly one object can be compared to a like object to measure the deviations of the second object from the first or master object, by subtracting their respective holograms. To unambiguously measure phase changes greater than $2\pi$ in the z-plane over two pixels in the x-y plane, holograms must be recorded at more than one wavelength (discussions of two-frequency interferometry are well-known in the literature and will not be repeated here).

The invention combines the use of high resolution video cameras, very small angle mixing of the holographic object and reference waves (mixing at an angle that results in at least two pixels per fringe and at least two fringes per spatial feature to be resolved), imaging of the object at the recording (camera) plane, and Fourier transform analysis of the spatially low-frequency heterodyne (side-band) hologram to make it possible to record holographic images (images with both the phase and amplitude recorded for every pixel). Additionally, an aperture stop can be used in the back focal plane of one or more lenses involved in focusing the object, to prevent aliasing of any frequencies higher than can be resolved by the imaging system (aliasing is thoroughly described in the literature and placing aperture stops in the back focal plane of a lens to limit the spatial frequencies present is also well described and well understood). No aperture is necessary if all spatial frequencies in the object are resolvable by the imaging system. Once recorded, it is possible to either replay the holographic images as 3-D phase or amplitude plots on a two-dimensional display or to replay the complete original recorded wave using a phase change crystal and white light or laser light to replay the original image. The original image is replayed by writing it in the phase-change medium with lasers, and either white light or another laser is used to replay it. By recording an image with three different colors of laser and combining the replayed images, it is possible to make a true-color hologram. By continuously writing and relaying a series of images, it is possible to form holographic motion pictures. Since these images are digitally recorded, they can also be broadcast with radio frequency (RF) waves (e.g., microwave) or over a digital network of fibers or cables using suitable digital encoding technology, and replayed at a remote site. This effectively allows holographic television and motion pictures or "HoloVision."

With regard to the use of a lens to focus the object onto the focal plane of the CCD, the diffraction pattern of a point can be described by a spherical function which has increasingly close fringe as the distance from the center of the pattern increases. As these fringes get closer and closer together, they are unresolvable by a video camera. Worse yet, the interaction of these point diffraction patterns from a complex object creates an impossibly dense and complicated pattern, which cannot be anywhere resolved by a video camera. Focusing the object on the recording plane eliminates these diffraction patterns, so that modern high-resolution video cameras can record holograms with reasonable fidelity.

If the recording media resolves 100 lines/mm, the holographic resolution will be approximately 16 lines/mm, or on the order of 50 microns, at unity magnification. This limit can be increased by the use of a magnification lens. For a camera resolution of 100 lines/mm, the hologram resolution will be approximately 160 lines/mm if a magnification of 10 is used. Similarly, the spatial resolution will be decreased by any de-magnification of the original image onto the recording camera.

The invention can also be embodied in a number of alternative approaches. For instance, the invention can use phase shifting rather than heterodyne acquisition of the hologram phase and amplitude for each pixel. Phase shifting interferometry is well documented in the literature. As another example, the invention can use numerous different methods of writing the intensity pattern to an optically sensitive crystal. These include using a sharply focused scanning laser beam (rather than using a spatial light modulator), writing with an spatial light modulator (SLM) but without the biasing laser beam, and many possible geometric variations of the writing scheme. As another example, the invention can use optically sensitive crystals employing optical effects other than phase change to create the diffraction grating to replay the hologram. As yet another example, the invention can actually use a very fine-pixeled spatial light modulator to create the intensity pattern, thereby obviating any need to write the intensity pattern to an optically active crystal for replaying the hologram.

EXAMPLE

A specific embodiment of the present invention will now be further described by the following, nonlimiting example which will serve to illustrate in some detail various features of significance. The example is intended merely to facilitate an understanding of ways in which the present invention may be practiced and to farther enable those of skill in the art to practice the present invention. Accordingly, the example should not be construed as limiting the scope of the present invention.

Figure 3A:
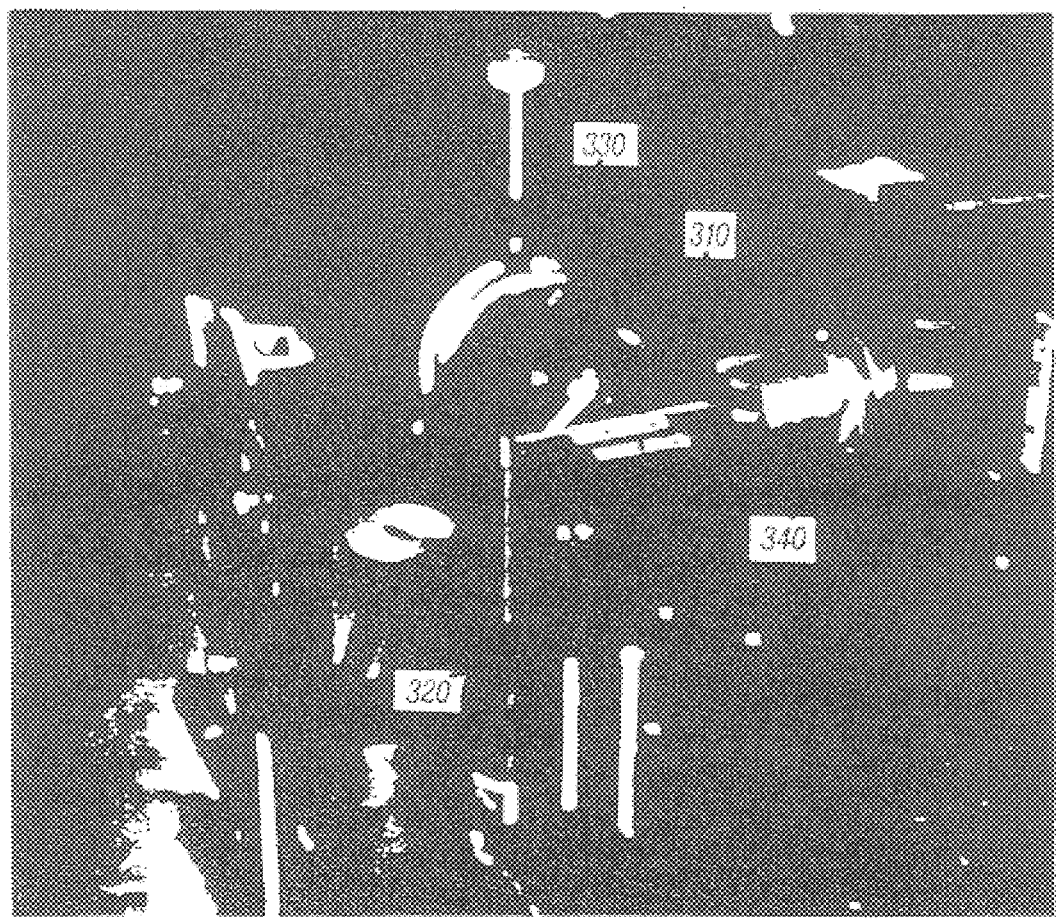
FIG. 3a illustrates a perspective view of a "Michelson" geometry direct-to-digital holography setup, representing an embodiment of the present invention.

FIG. 3A is a perspective view of an exemplary "Michelson" geometry for direct-to-digital holography is shown.

Laser light is provided to a beamsplitter 310. An object beam from the beamsplitter 310 travels to a semiconductor wafer mount 320 and then to a focusing lens 330. Meanwhile, a reference beam from the beamsplitter 310 travels to a reference beam mirror that is mounted on a piezoelectric reference beam mirror mount 340.

Figure 3B:
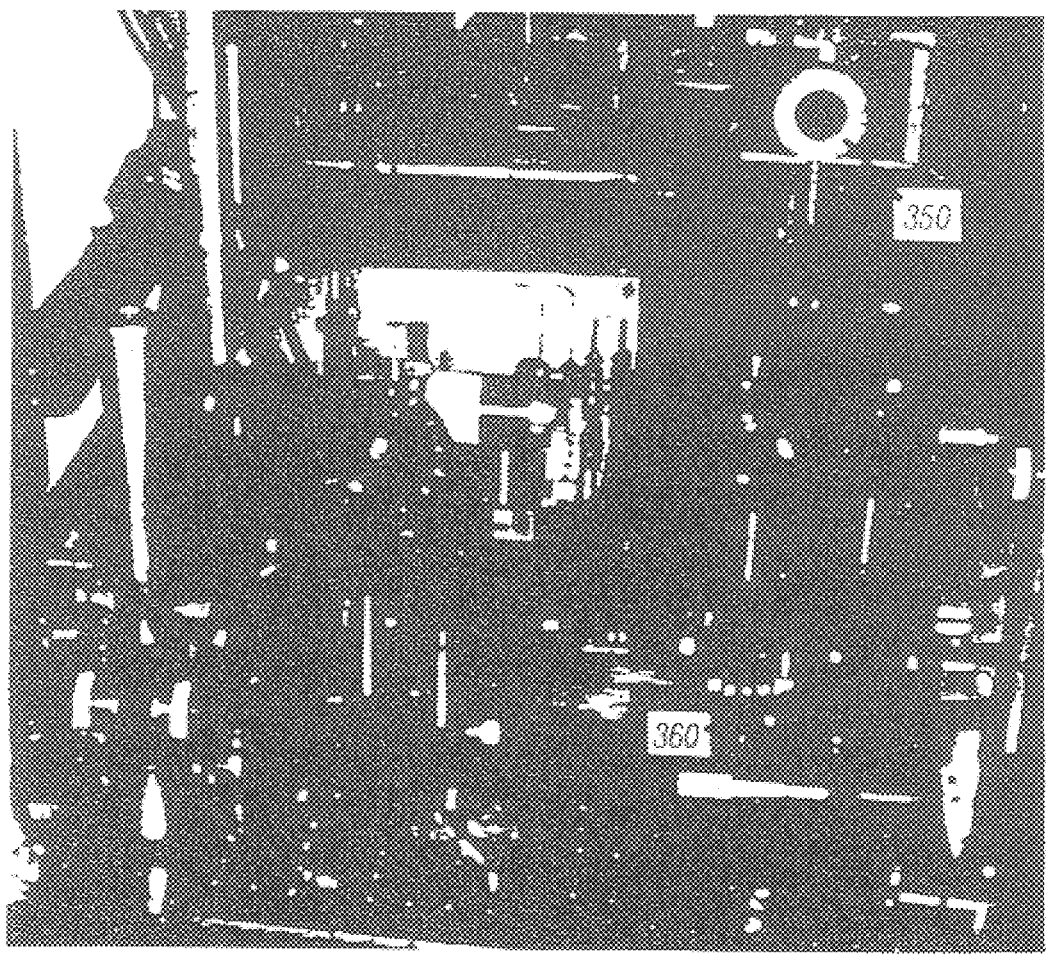
FIG. 3b illustrates another perspective view of the direct-to-digital holography setup shown in FIG. 3A.

FIG. 3B is another perspective view of the exemplary recording "Michelson" geometry is shown. In this view, the position of a direct-to-digital CCD camera 350 with regard to the other subcomponents of the apparatus can be more readily appreciated. In this view, the position of an object target mount 360 can also be more readily appreciated.

Figure 4:
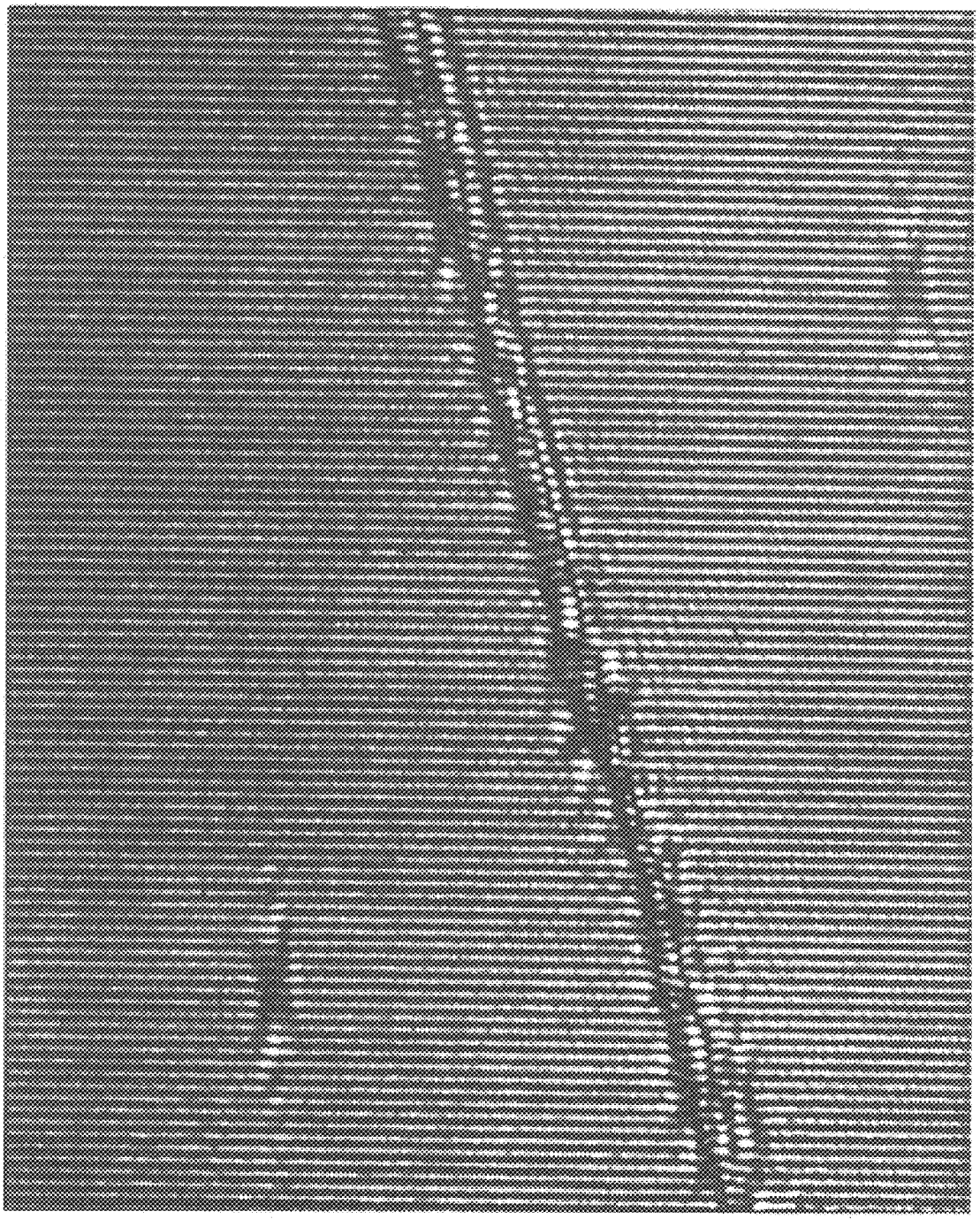
FIG. 4 illustrates a digitally acquired hologram of a scratch in a mirror, representing an embodiment of the present invention.

FIG. 4 is a heterodyne (sideband) hologram of a scratch in a mirror (the object in this case). The hologram was made with the direct to digital holography system illustrated in FIGS. 3A–3B and described above. The fringes observable in the hologram are due to the interference between the reference and object beams. The reference beam mirror was tilted slightly to create these fringes. It is the presence of these fringes which allows Fourier transform analysis of the hologram to calculate the phase and amplitude for the pixels of the hologram. The Fourier transform analysis will be discussed in more detail below.

Figure 5:
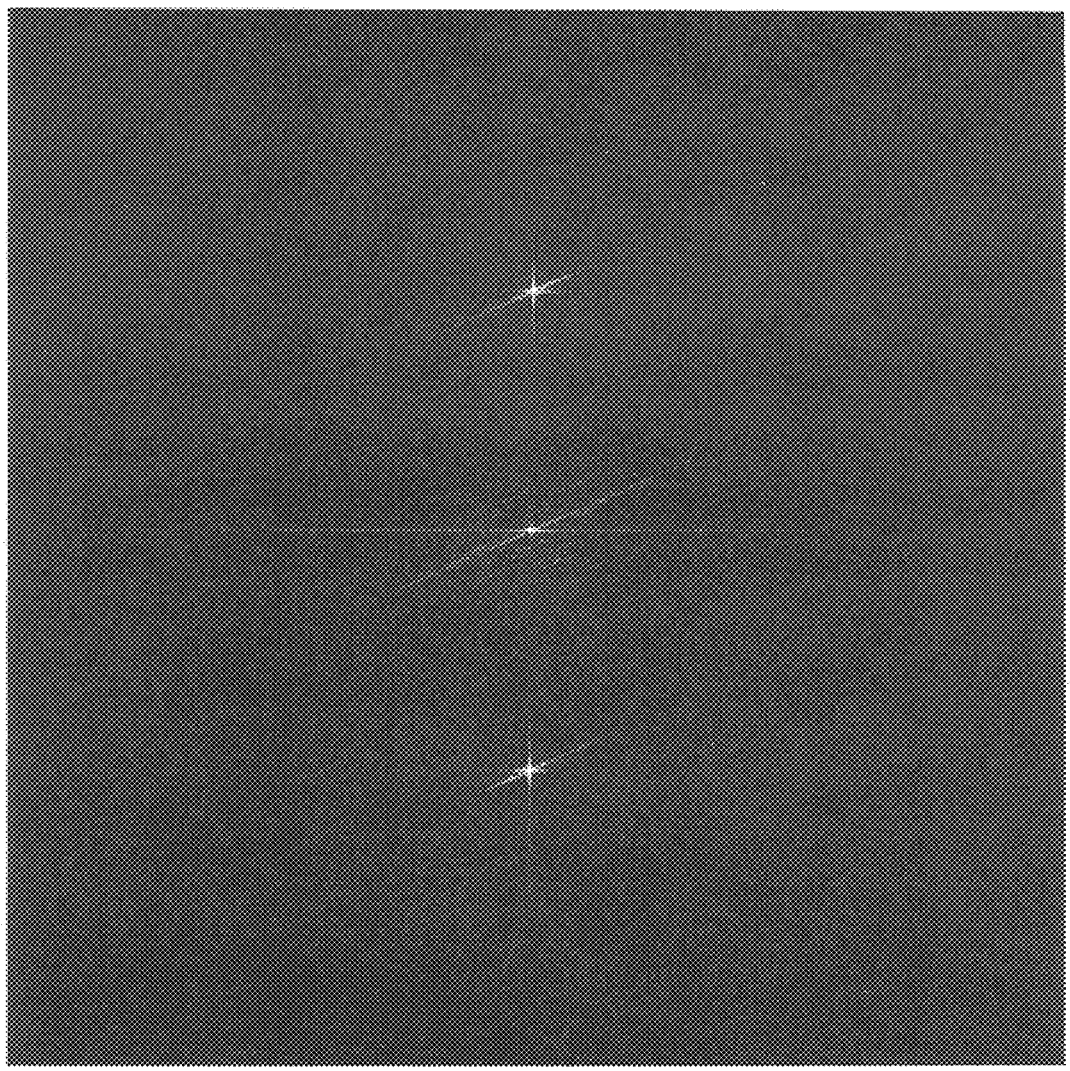
FIG. 5 illustrates a plot of a 2-D Fourier transform of FIG. 4.

FIG. 5 is a graphical plot of the two-dimensional Fourier transform of FIG. 4. The x axis is the spatial frequency axis along the x dimension and the y axis is the spatial frequency axis along the y dimension. The actual data itself is a matrix of numbers corresponding to the strength of a particular spatial frequency in $(f_x, f_y)$ frequency space. The number and brightness of the white dots shows the strength and position in frequency space of the spatial frequencies present in FIG. 4. It can be appreciated from FIG. 5 that the reference beam fringes act as a heterodyne local oscillator shifting the real and virtual hologram images off-axis and allowing their separation in frequency space. It is known from Shannon's Theorem (or Nyquist's limit) that at least two pixels per fringe are required to resolve a fringe, and from electron holography that at least 3 fringes per resolvable feature are required to resolve the object in the hologram (nominally it would require three to four fringes per feature to allow resolution of the carrier spatial frequency plus the object frequencies, but work on the extended Fourier transform by Voelkl, et al.,[10-12] allows the use of 2 fringes per feature). Thus, these two limits determine the required magnification of an object and the tilt angle between the reference and object beams in order to resolve a feature (spatial frequency) in a hologram.

The data shown in FIG. 5 is analyzed by transforming (shifting) the axes in Fourier space to sit on top of the heterodyne carrier frequency (the spatial frequency caused by the small angle tilt between the object and reference beams), then applying a digital filter (e.g., a Hanning or Butterworth filter) to cut off the signals around the original origin (these are actually the signals resulting from the reference beam interacting with itself and the object beam interacting with itself, and are just noise from the hologram point of view), and then performing the inverse Fourier transform. All of this analysis can be carried out on a digital computer and can be done in real time. Real time analysis may require as many as 30 to 100 high performance parallel processors (e.g., Pentium Pro or DEC Alpha) to achieve a frame rate of 30 frames per second. Computer systems of this size are presently commonly used as large database servers and stock market calculational engines. They are also suitable for short-term low resolution weather forecasting, and image manipulation and creation for the film industry. It can be expected that such systems will be desktop systems within 6 to 10 years.

Figure 6:
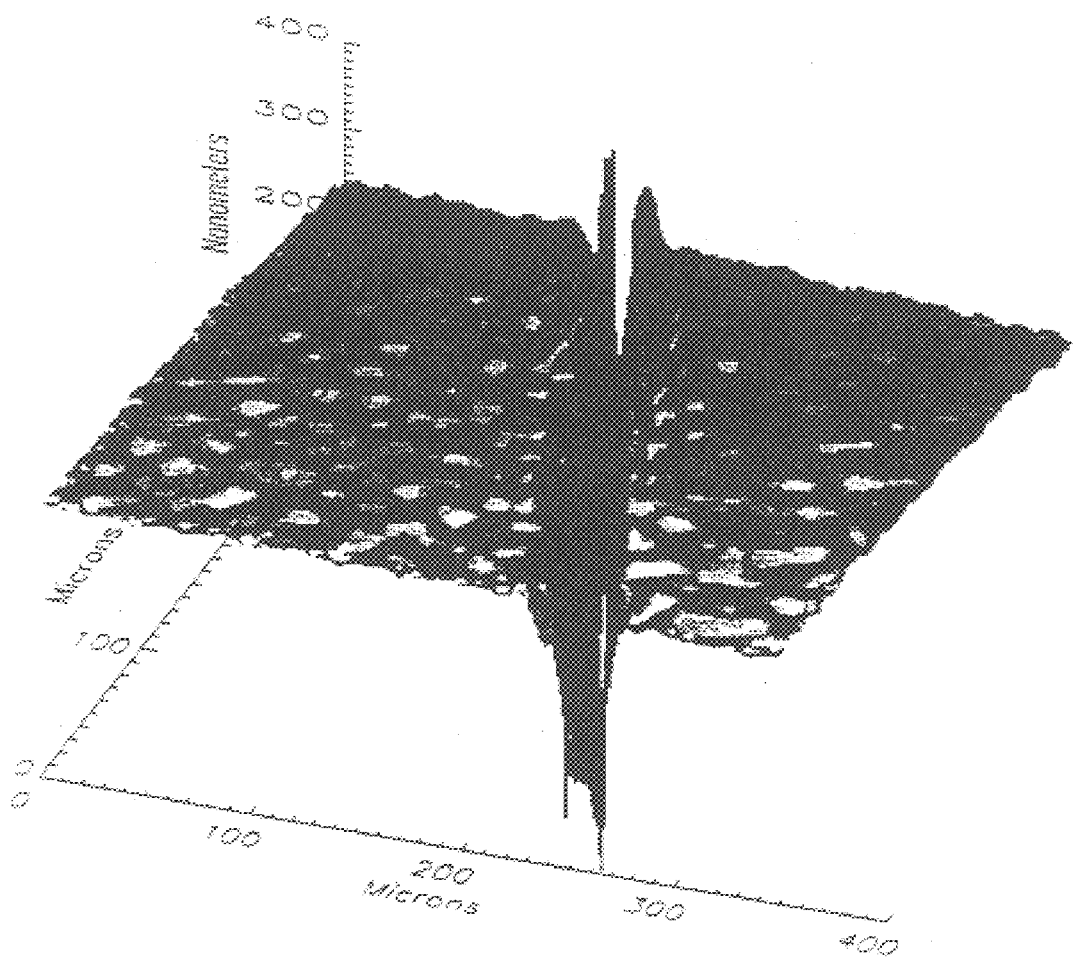
FIG. 6 illustrates a replay of hologram phase data from the hologram of FIG. 4.

FIG. 6 shows a replay of the phase data created by performing the described analysis on the data (hologram) from FIG. 5. Replaying the data as an actual hologram will require the creation of a diffraction grating in an optical crystal and illumination of the diffraction grating with laser light (or appropriately treated white light) at the correct angle. The data to be actually written to the optically sensitive crystal is calculated from the hologram data by adding a function $f(x,y,z^o)$ to each pixel $h(x,y,z^o)$ of the hologram data, where both functions are complex and:

$$f(x,y)=e^{ik\cos(\alpha)r}$$

and r is the square root of $x^2+y^2+z^{2^o}$

The exponential function added above corresponds physically to adding a plane wave intersecting at angle a with the original object wave of the hologram. The function created by the sum is multiplied by its complex conjugate to form the absolute value intensity function, which is written to the light-sensitive crystal with the laser (it may also be possible to write only the intensity cross-term of the reference beam with the object, and drop the autocorrelation terms). The diffraction grating thus created in the light sensitive crystal can then be illuminated with laser light at angle a to replay the original hologram. If a crystal is used which has a temporary phase change or refractive index change when written with laser light, then by continuously writing new images from either instantaneously acquired or stored holograms, and illuminating each image with laser light from another laser (or appropriately treated white light) at the angle α, a 3-D motion picture or 3-D television image can be created. This is just one possible method and not the only possible method for writing the holographic image to an optically sensitive crystal and then replaying it.

Figure 7:
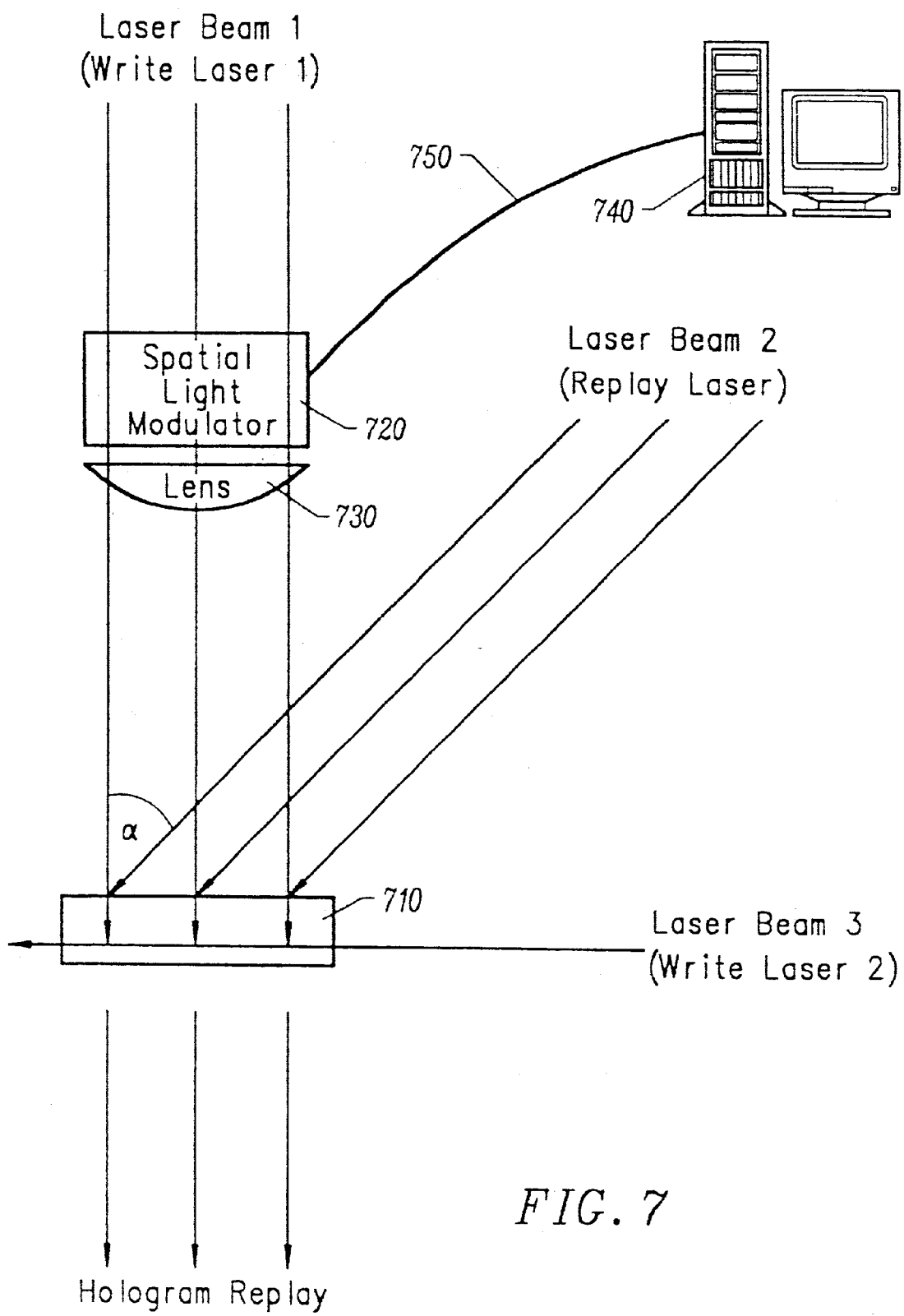
FIG. 7 illustrates a schematic view of a holographic replay system, representing an embodiment of the present invention.

FIG. 7 depicts a method for generating a motion picture or television using the invention. It can be appreciated that the hologram is written to the phase change or other optically active crystal by intersecting two laser beams in a phase change crystal 710. Laser Beam 1 is passed through a spatial light modulator 720 to modulate the hologram intensity pattern into it, created mathematically from the original hologram as described above. SLM 720 is controlled by a computer 740 via a data path 750. A focusing lens 730 focuses this pattern in the phase change crystal 710 at the intersection of Laser Beam 1 with Laser Beam 3, where the combined intensity of the two lasers is adequate to write the pattern to the crystal 710. After the pattern is written, Laser Beam 2, incident on the crystal 710 at angle a replays the original hologram.

Introduction to Lightwave Holography

In order that the hologram processing steps described herein can be more easily understood, it is useful briefly to review first the nature of off-axis holography. In an electron microscope, equipped with a highly coherent electron source, e.g. one using a field-emission electron gun, the electron beam that is incident on the specimen is, ideally, a plane wave. In practice, this can be achieved to a reasonable approximation if the illumination is spread over a large area. In this ideal case, the object in the microscope modifies the incident plane wave $\exp(ik\,\vec{r})$ to the object wave $o(\vec{r})$, which is defined as:

$$o(\vec{r})=a(\vec{r})\cdot e^{i\phi(\vec{r})} \quad (1)$$

Both $a(\vec{r})$ and $\phi(\vec{r})$ are real functions and describe the object amplitude and the object phase, respectively. The vector $\vec{r}$ is a vector in the specimen plane, or the (x,y) plane. For reasons of simplicity, magnification factors and image rotations are ignored, so vectors in the image plane and the object plane coincide.

When recording the off-axis hologram, the object is, ideally, positioned exclusively on one side of the biprism. The biprism then overlaps the image wave (or object wave depending on the experimental set-up) with the reference wave, i.e. the wave on the other side of the biprism (Lichte, 1986; Joy et al., 1993; Möllenstedt & Düker, 1956; Tonomura, 1993). Ideally, the reference wave is a plane wave that does not go through any part of the specimen. This however, is not an exclusive requirement and acceptable results may still be obtained if the reference wave goes through the specimen or is deformed by magnetic or electric fields. In the image plane below the biprism we find the image intensity $I(\vec{r})$ (Völkl & Lichte, 1990):

$$I(\vec{r})=1+A^2(\vec{r})+I^{inel}(\vec{r})+2\cdot A(\vec{r})\cdot\cos(\Delta\vec{k}\cdot\vec{r}+\Phi(\vec{r})) \quad (2)$$

where the additional term $I^{inel}(\vec{r})$ takes the inelastically scattered photons into account. The term $|\Delta\vec{k}|$ describes the spatial frequency of the holographic fringes. $A(\vec{r})$ and $\Phi(\vec{r})$ describe the image amplitude and phase, which are different from the object amplitude and phase due to the aberrations of the objective lens (and other sources of disturbances). The term μ describes the contrast of the interference fringes if no object is used, i.e. A=1, and $I^{inel}$ and Φ are zero.

Figure 8:
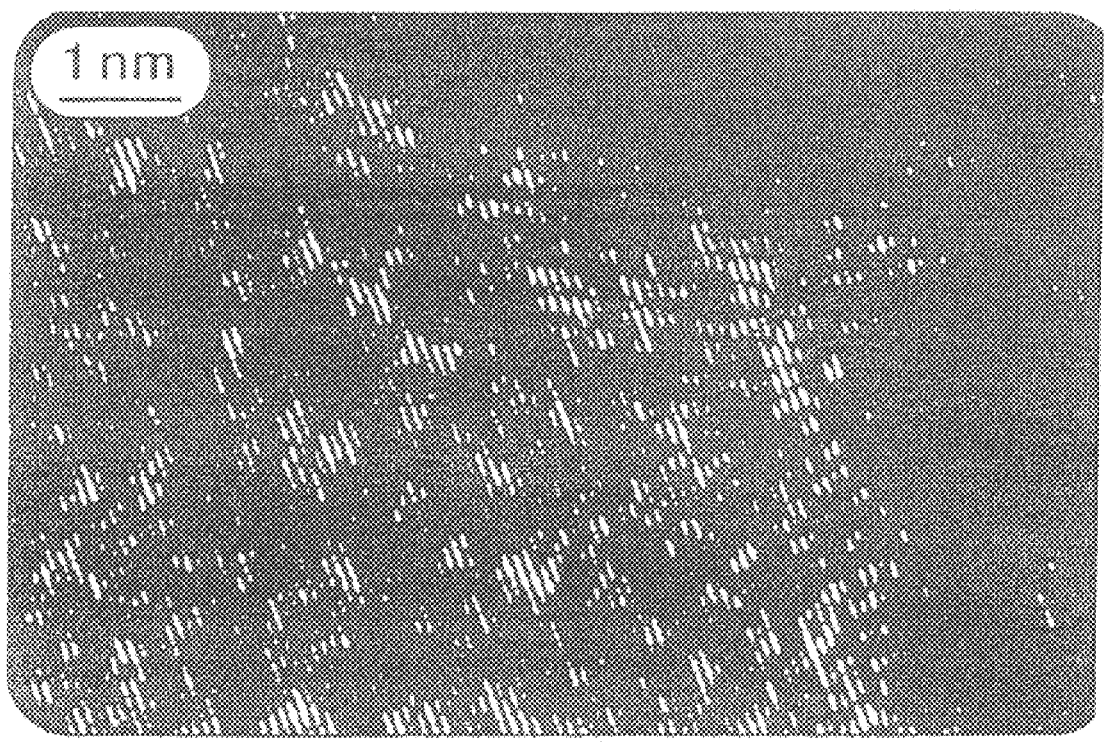
FIG. 8 illustrates a selected area of a hologram of gold particles on an amorphous carbon film, representing an embodiment of the present invention.

In FIG. 8, a small area selected from a hologram of gold particles on an amorphous carbon foil is displayed to show the interference fringes. They run from the top left to the bottom right corner of the image. In order to extract the information about the (complex) image wave, and from that the amplitude and phase, a Fourier transform (FT) of the image intensity $I(\vec{r})$ is performed and we obtain $$FT\{I(\vec{r})\}=FT\{1+I^{inel}+A^2(\vec{r})\}+$$
$$\delta(\Delta\vec{k}-\vec{q})*FT\{A(\vec{r})\cdot e^{i\Phi(\vec{r})}\}+$$
$$\delta(\Delta\vec{k}+\vec{q})*FT\{A(\vec{r})\cdot e^{-i\Phi(\vec{r})}\} \quad (3)$$

where * denotes convolution.

Figure 9:
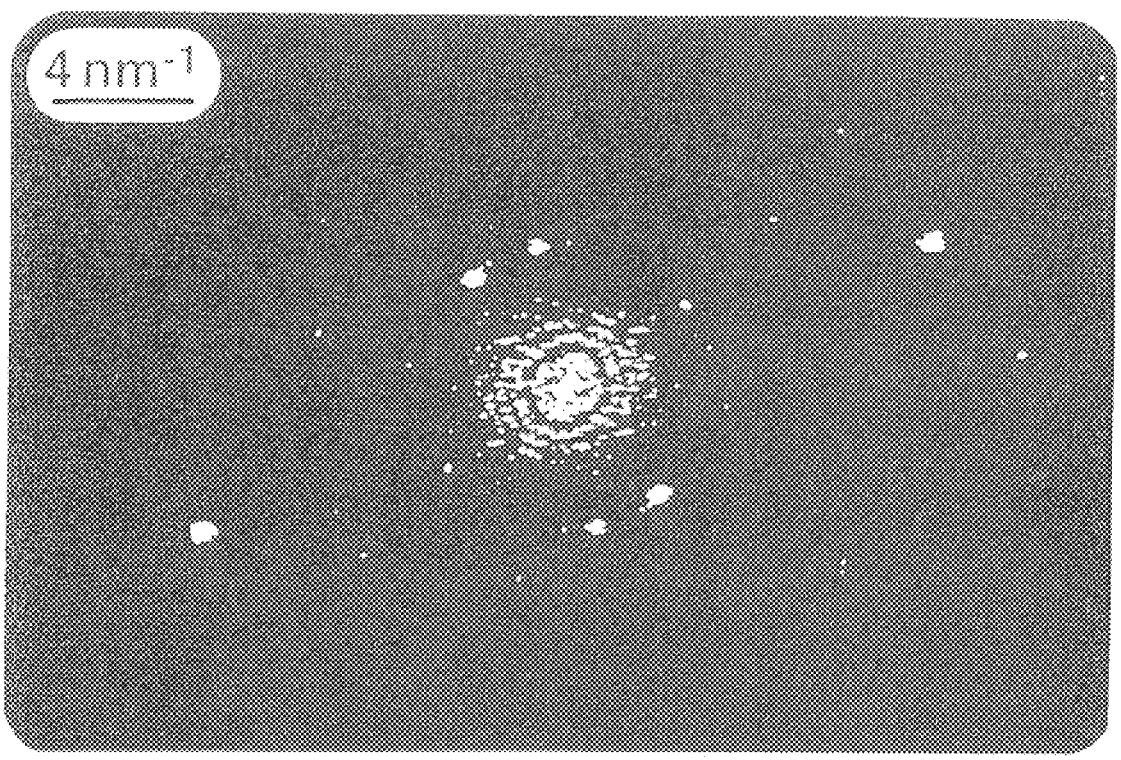
FIG. 9 illustrates a selected area of the modulus of the Fourier transform of the hologram in FIG. 8 (center area: the autocorrelation; left and right area: the sidebands), representing an embodiment of the present invention.

The Fourier transform of the hologram of FIG. 8 is displayed in FIG. 9. The central area is known as the 'autocorrelation', which corresponds to the Fourier transform of a conventional image. The interesting features in this image are the 'sidebands' that look like ears around the autocorrelation. A closer look shows that there is, for example, no centrosymmetry with respect to the center of the sideband: opposite beams do not have the same intensity; this is a mathematical necessity).

The last two lines of Eq.(3) correspond to the two sidebands in FIG. 9. By isolating one of the sidebands from the Fourier transform we retain the Fourier transform of the complex image wave. Ignoring chromatic aberrations, the Fourier transform of the complex image wave corresponds to the Fourier transform of the complex object wave in the following way:

$$FT\{A(\vec{r})\cdot e^{i\Phi(\vec{r})}\}=FT\{A(\vec{r})\cdot e^{-i\Phi(\vec{r})}\}\cdot e^{i\chi(\vec{q})} \quad (4)$$

where the term $\chi(\vec{q})$ describes the isoplanatic wave aberrations. Here, $\vec{q}$ is a two-dimensional vector in the Fourier space (or reciprocal space), i.e., the back focal plane of the objective lens. It is obvious from this equation that if $\chi(\vec{q})$ is known, this information can be used to cancel the influence of $\chi(\vec{q})$, which results in an improvement in the point resolution (Tonomura et al., 1979; Fu et al., 1991). This is desirable, as the interpretation of high-resolution crystal structure images then becomes more intuitive.

Figure 10B:
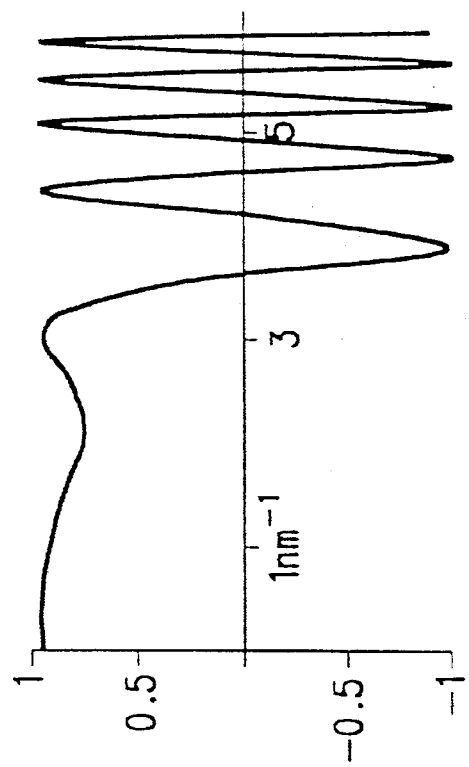
FIG. 10B illustrates a holography special transfer function at Gabor focus, representing an embodiment of the present invention.
Figure 10A:
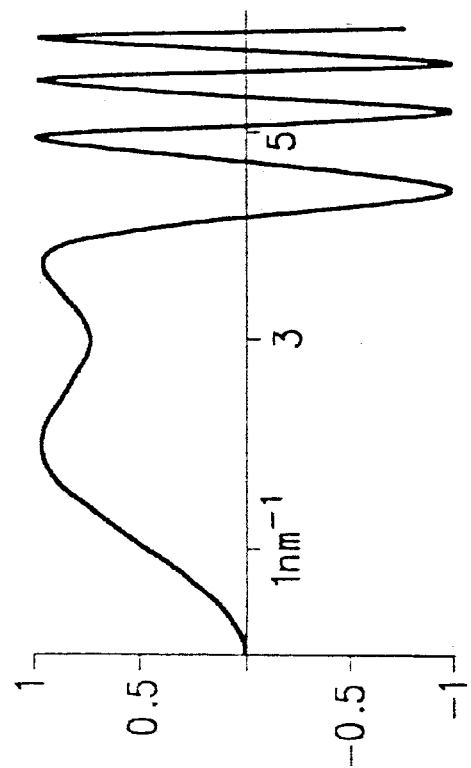
FIG. 10A illustrates a contrast transfer function at Scherzer focus.

Besides the possible improvements of the point resolution of a microscope, another important feature of lightwave holography is the direct accessibility of the image phase. In contrast to the conventional contrast transfer function which is a sin-function (Reimer, 1989) and displaced in FIG. 10A, the transfer function of the object phase into the image phase is described by the cos-function. This transfer function is displayed in FIG. 10B. The advantage of the cos-type transfer function is that the large area contrast (details of size >1 nm) is not decreased and, apart from a slightly degraded point resolution, the total amount of information is higher in the image phase than in the image intensity at Gabor focus (Weierstall, 1989; Lichte, 1991). This is one of the reasons why a direct display of the image phase is preferable over the image intensity in some cases.

The Extended Fourier Transform.

In order to evaluate holograms in a computer, discrete Fourier optics is conventionally used. Although the discrete Fourier transform of an image contains the same information as the original image, the conventional discrete Fourier transform is not the ideal tool to perform this task.

To illustrate this, let us consider a discrete image of size N×N pixels which is readily obtained from a slow-scan CCD camera. Suppose the size of one pixel of the CCD camera has the dimension d×d, and the distance between neighboring pixels is also d. The image function I(x,y) is recorded at each pixel, and has the value:

$$I_{mn} = \frac{1}{d^2} \int_{(m-1)d}^{md} \int_{(n-1)d}^{nd} I(x,y) dx dy, \quad (5)$$

with m, n=1, ..., N. $I_{m,n}$ is slightly different from the values of the function I(x,y) at the center of the pixel ((m−½)d), (n, −½)d)) due to the integration over the area of the pixel. This effect together with others contributes to the MTF of the CCD camera. For this discussion, we will assume that the MTF has been corrected for and therefore I((m−½)d), (n, −½)d))=$I_{n,m}$. We also assume, for the moment, that I(x,y) has the form:

$$I(x, y) = \cos[2\pi(xu+yv)] \quad (6)$$

for $0 \leq x, y \leq Nd$, and is 0 elsewhere. The digitized image $I_{m,n}$ is:

$$I_{m,n} = \cos\{2\pi[(m-\frac{1}{2})ud + (n-\frac{1}{2})vd]\} \quad (7)$$

for $0 \leq m, n \leq N$, and is 0 elsewhere. We define the number of pixels needed to cover $2\pi$ in the direction perpendicular to the fringes defined in Eq. (7) as the sampling rate s for the spatial frequency $$s := \frac{1}{d\sqrt{u^2 + v^2}} \quad (8)$$

Figure 11:
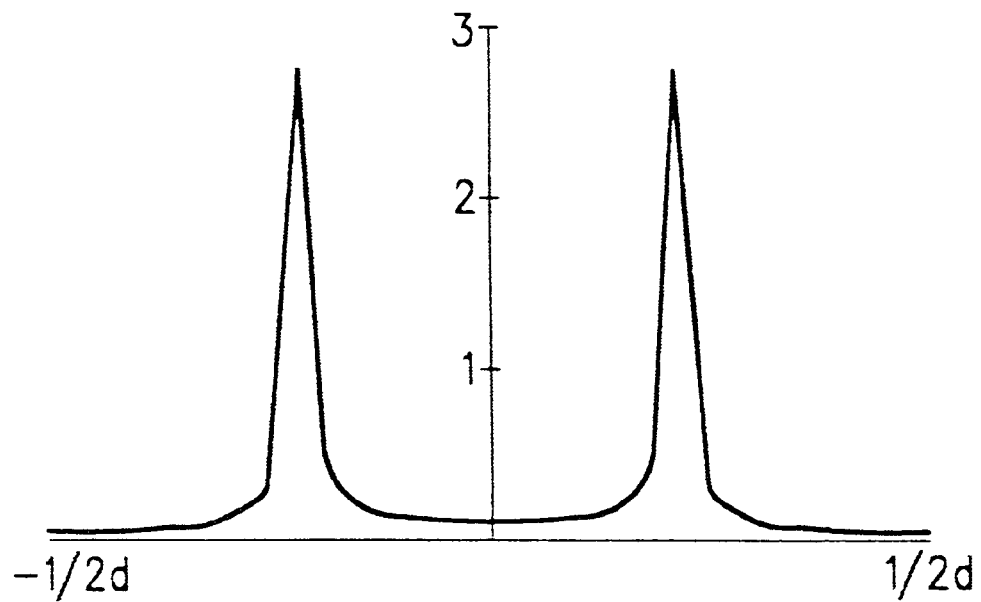
FIG. 11 illustrates a modulus of discrete Fourier transform of cos-pattern sampled with 32 points at sampling rate s=4.66 (number of display points in discrete Fourier transform is 32), representing an embodiment of the present invention.

It is not required that this number of pixels be an integer. The sampling theorem states that if the image function I(x,y) is sampled such that no spatial frequency of the image is sampled below the Nyquist limit[12], then the image function is uniquely defined within the area of the CCD camera. In other words, if all the spatial frequencies of the image function I(x,y) are sampled with $s \leq 2$, then the information $I_{m,n}$ on I(x,y) within the area of the CCD camera is complete. Therefore, it should be a question of display only, if I(x,y) is displayed with, for example, 124×124 or 13789×13789 sampling points (i.e., display points), both in real space and in Fourier space. The discrete Fourier transform $FT^d \{ \ldots \}$ is defined as:

$$FT^d(\ldots) = \frac{1}{N} \sum_{m,n=1}^{N} (\ldots) e^{-2\pi i(km+\epsilon n)/N} \quad (9)$$

where $N/2 \leq k, l \leq N/2-1$. FIG. 11 shows the modulus of the Fourier transform of Eq. (7) $FT^d\{I_m\}$ in one dimension and N=32. The motivation for an extended Fourier algorithm originally came from the surprising difference in the display between the modulus of $FT^d\{I_m\}$ and the display of the modulus of the analytic Fourier transform of Eq.(6) $FT^a\{I(x)\}$. The analytic Fourier transform FTa is defined as:

$$FT^a\{\ldots\} = \int\int_{-\infty}^{\infty} \{\ldots\} e^{2\pi i(xu+yu)} dx dy \quad (10)$$

$$= \int\int_{0}^{Nd} \{\ldots\} e^{2\pi i(xu+yu)} dx dy.$$

Figure 12:
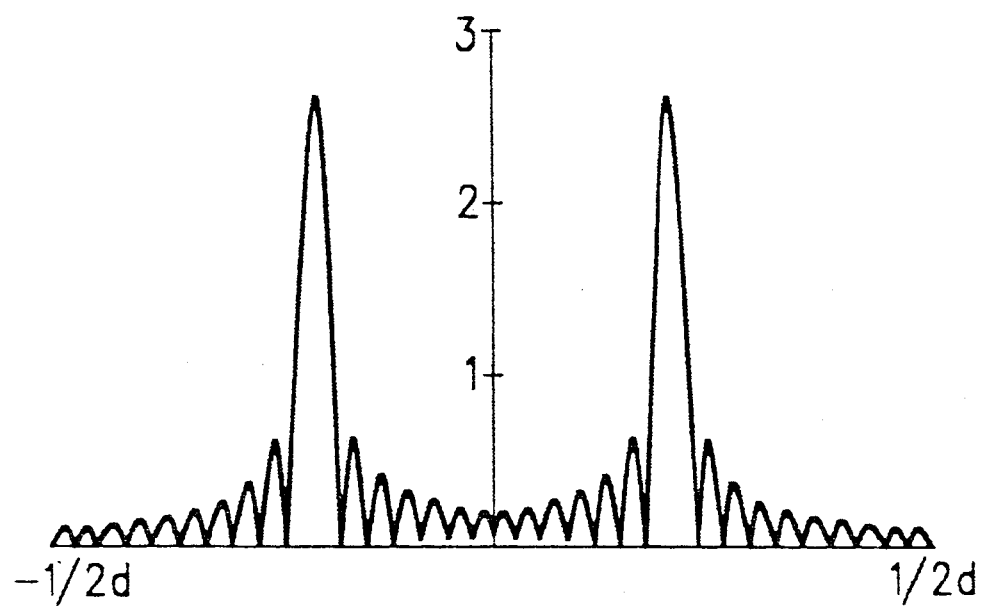
FIG. 12 illustrates a modulus of analytic Fourier transform of cos-pattern according to Eq. (6) (cos-pattern is limited to same area (in real space) as data from FIG. 11 and none of the details in this figure can be found in FIG. 11), representing an embodiment of the present invention.

The modulus of $FT^a\{I(x)\}$ is displayed in FIG. 12. In comparing FIGS. 11 and 12, it is clear that none of the details visible in FIG. 12 are found in FIG. 11. Also, the $FT^a$ extends to infinity in Fourier space, whereas the $FT^d$ does not extend beyond the well known Nyquist limit at 1/(2d).

The (discrete) extended Fourier transform EFT is defined as follows:

$$EFT\{\ldots\} = \frac{1}{N} \sum_{m,n=1}^{N} \{\ldots\} \times e^{-2\pi i[(k+\Delta k)m+(l+\Delta l)n]/(N\tau)}, \quad (11)$$

with $-1 \leq \Delta k$, $\Delta l \leq 1$; $-N\tau/2 \leq k$, $1 \leq 1N\tau/2-1$. The inverse extended Fourier transform is defined as:

$$EFT^{-1}\{\ldots\} = \frac{1}{N\tau^2} \sum_{k,l=-N\tau/2}^{N\tau/2-1} \{\ldots\} \times e^{-2\pi i[(k+\Delta k)m+(l+\Delta l)n]/(N\tau)}, \quad (12)$$

The new variables $\Delta k$, $l\Delta$ and $\tau$ permit a change in the display in Fourier space as well as the number of display points. Note that for $\Delta k$, $\Delta l = 0$ and $\tau = 1$, $EFT = FTP^d$.

The effect of $\tau$

Figure 13:
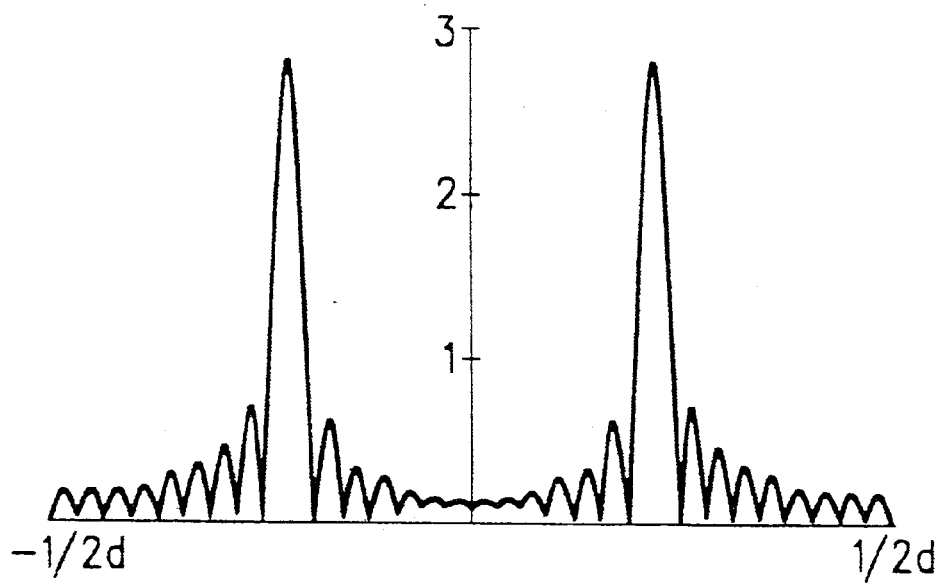
FIG. 13 illustrates a modulus of extended Fourier transform of cos-pattern (original set of display points was 32 as in FIG. 11; choosing parameter $\pi$ to be 16, number of display points in extended Fourier transform is 512 and shows same details as visible in analytic Fourier transform), representing an embodiment of the present invention.

The effect of $\tau$ can be seen from FIG. 13. Using $\tau = 16$ and $\Delta k$, $\Delta l = 0$, there are now $N\Delta = 512$ points to display in Fourier space instead of N=32 points as in FIG. 11. Obviously, the details visible in the analytic Fourier transform (FIG. 12) appear in the discrete EFT too. But again, both the EFT (for $\tau \geq 1$) and the $FT^d$ contain the same information. There are still two differences in the display of the modulus of the analytic and the modulus of the extended Fourier transform. First the Nyquist limit still holds for the extended Fourier transform and no spatial frequencies show up beyond the Nyquist limit. Second, the limited image area causes higher frequencies in Fourier space, which are reflected back at the Nyquist limit and cause differences such as the disappearance of the very fine details visible in the $FT^a$.

The effect of Δk

Figure 14:
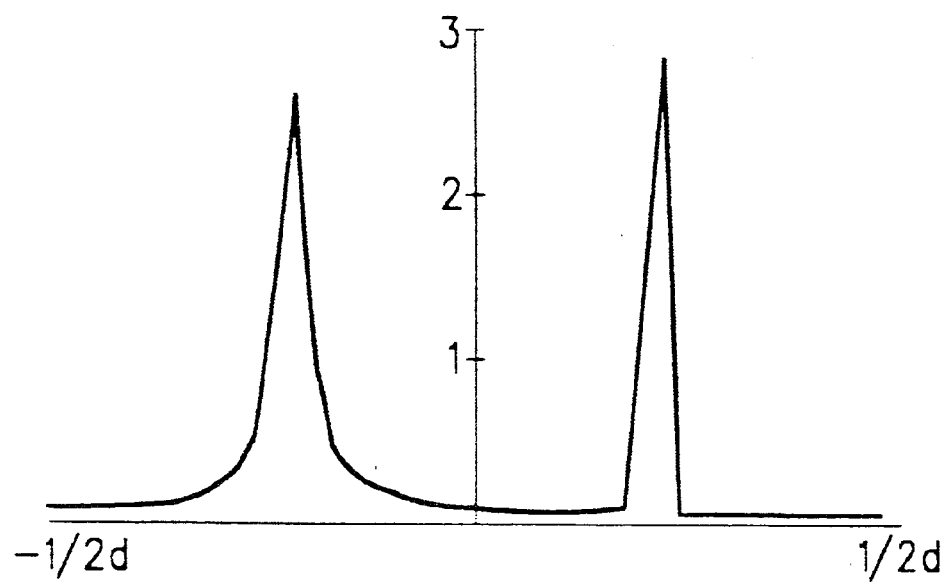
FIG. 14 illustrates the results of an extended Fourier algorithm which allows display of conventional discrete Fourier transform but shifted by fraction of pixel (again, same cos-pattern as for FIG. 11 is used; choosing true values for $\Delta k$ (and, $\Delta l$ in two dimensions), it is possible to display at least one peak in Fourier space such that it falls directly on display point; in this case, sidelobes disappear (see right peak)), representing an embodiment of the present invention.

The effect of Δk in EFT{$I_m$} is displayed in FIG. 14 for the special case Δk=0.133 and τ=1. In comparison to FIG. 11, the right of the two peaks now coincides exactly with a pixel (or display point) in Fourier space. This causes the sidelobes, as visible in FIG. 11, to disappear.

This shifting of the display points in Fourier space is very important for off-axis lightwave holography, especially for the reconstruction of the image amplitude (under most circumstances, the wedge in the reconstructed phase, caused by the center of the sideband being off a display point, can be compensated easily). The effect of the center of the sideband being off a display point is to cause noise in the reconstructed amplitude.

Figure 15:
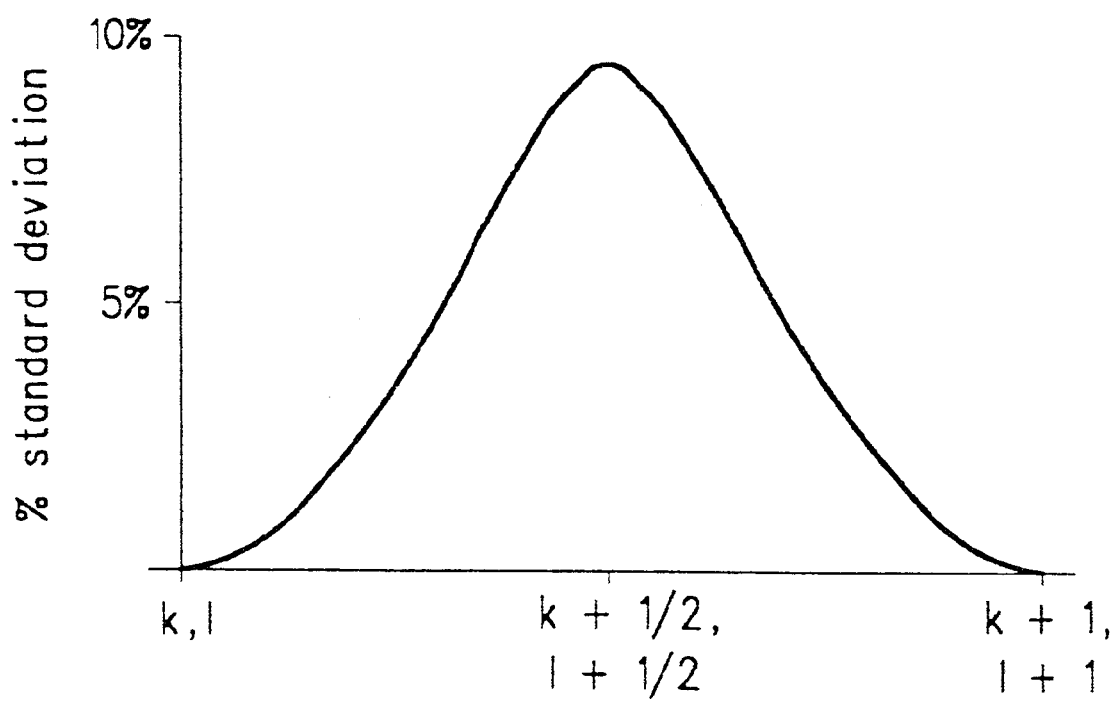
FIG. 15 illustrates that reconstructing amplitude from a sideband that is not truly centered causes artifacts in image (the worst situation is when center of the sideband falls exactly in between display points in Fourier space), representing an embodiment of the present invention.

We can demonstrate the effect of the center of the sideband being actually off center of a display point in Fourier space on the reconstruction. To do this, we generate an empty hologram in the computer (image size 512×512) such that the sideband falls exactly on the display point (k,l) in Fourier space. In this case, the reconstructed amplitude is flat and shows a mean standard deviation of effectively 0%. A slight change in the generation, i.e. decreasing the sampling rate s, causes the center of the sideband to fall between the display points (k,l) and (k+1, l+1). Again, the mean standard deviation is computed, and we continue to decrease the sampling rate until the center of the sideband falls on the display point (k+1, l+1). The result of this simulation is displayed in FIG. 15. In the worst case, when the center of the sideband is found at (k+½, l+½), the mean standard deviation in the reconstructed amplitude reaches 10%.

Based on the above observations, the following reconstruction procedure can be advantageous:
(1) Select area hologram that does not show object contributions (if possible).
(2) Apply Hanning window to this area (or all of hologram).
(3) Perform $FT^d$ and extract information about exact position of sideband. This defines Δk and Δl for the extended Fourier algorithm.
(4) Apply EFT using the information on Δk and Δl. Use τ=1.
(5) Isolate sideband, which is now perfectly centered.
(6) Perform inverse $FT^d$.
(7) Extract amplitude and phase.

Example. Apply Hanning window and perform $FT^d$. Position of sideband is, lets say, (134.62, 172.31), using W. J. de Ruigter et al. in Proc. $10^{th}$ Pfefferkom Conf. Scanning Microsc. Suppl. 6 (1992) 347; →Δk=0.62 and Δl=0.31. Use these data together with τ=1 and perform EFT of hologram. The sideband is now centered on a display point and artifacts are reduced in the reconstructed amplitude.

DIGITAL HOLOGRAM ACQUISITION SYSTEM IMPROVEMENTS

Through the Lens Illumination and Mach-Zender Geometry

The invention can include through the lens illumination of the target object, thereby allowing the objective to be close to the object. The invention can include Mach-Zender geometry which allows a large range of adjustability of carrier frequency fringes in comparison with Michelson geometry while maintaining object and reference beam overlap.

Figure 16:
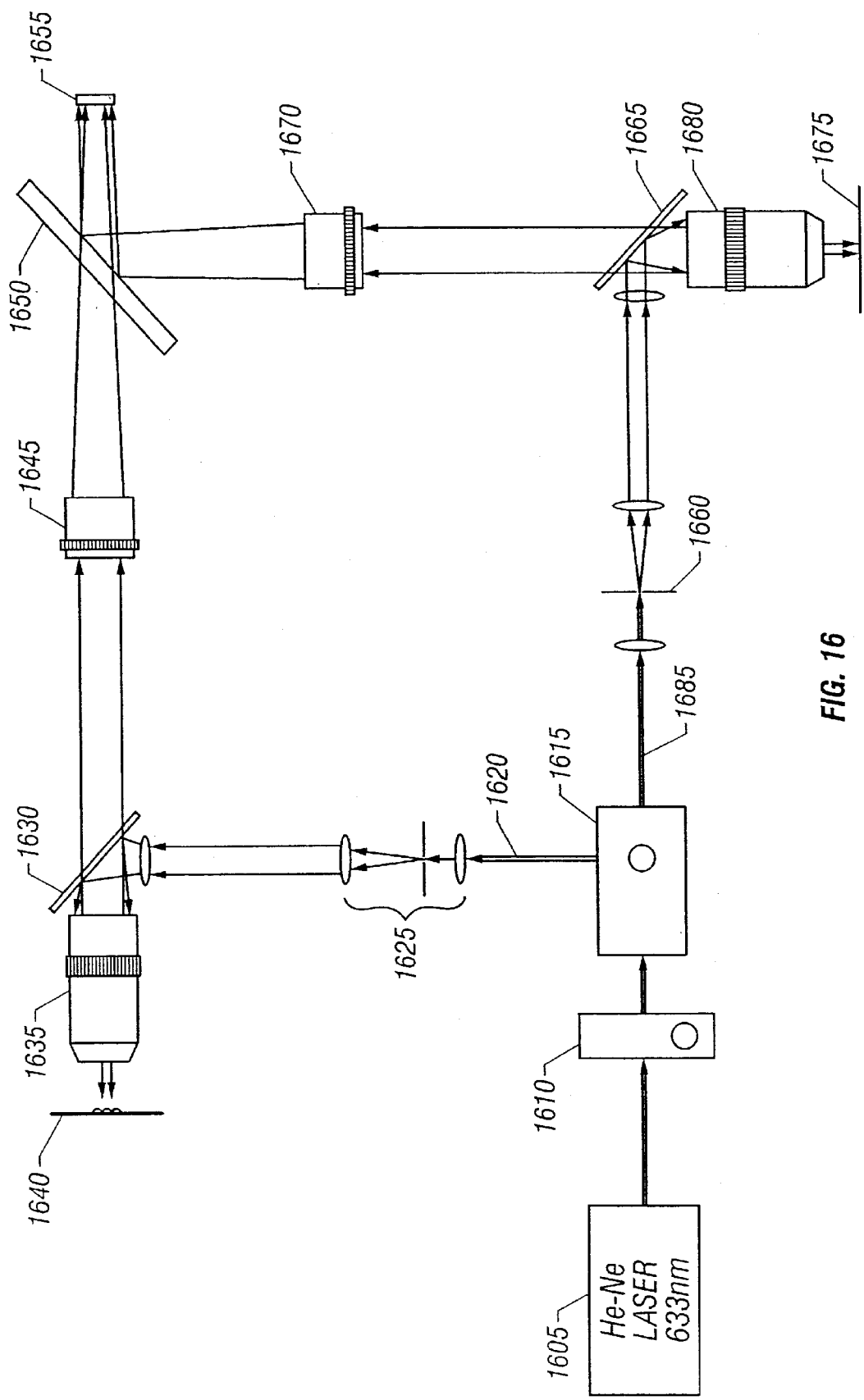
FIG. 16 illustrates a Mach-Zender layout schematic of a hologram acquisition system with through-the-lens illumination, representing an embodiment of the invention.

Referring to FIG. 16, a laser 1605 is optically coupled to a variable attenuator 1610, which is optically coupled to a variable beamsplitter 1615. A spatial filter with beam expander assembly 1625 is optically coupled to the variable beamsplitter 1615. An illumination beamsplitter 1630 is optically coupled to the assembly 1625. An objective lens 1635 is optically coupled to the beamsplitter 1630. An object 1640 of interest is near lens 1635. A beam combiner 1650 is coupled to the beamsplitter 1630 via a tube lens 1645. A CCD camera 1655 is optically coupled to the beam combiner 1650. Reference beamsplitter 1665 is optically coupled to beamsplitter 1615 via another spatial filter with beam expander assembly 1660. A reference mirror 1675 is optically coupled to the beamsplitter 1665 via a reference objective lens 1680. The beam combiner 1650 is optically coupled to the beamsplitter 1665 via another tube lens 1670.

Still referring to FIG. 16, an object beam 1620 from the variable beamsplitter 1615 passes through the assembly 1625, is reflected by illumination beamsplitter 1630 and then passes through an object objective lens 1635. The object beam 1620 then interacts with an object 1640 of interest, passes back through lens 1635 and then passes through the illumination beamsplitter 1630 toward the beam combiner 1650 via the tube lens 1645. A reference beam 1685 passes through the assembly 1660, is reflected by the reference beamsplitter 1665 and then passes through the reference objective 1660. The reference beam 1685 then reflects from the reference mirror 1675, passes back through lens 1680 and then passes through the reference beamsplitter 1665 toward the beam combiner 1650 via the tube lens 1670. The combined beams travel from beam combiner 1650 to the CCD camera 1655 where digital data is collected. Of course, the digital data can be recorded, transmitted and/or transformed.

FIG. 16 shows a schematic of a Mach-Zender geometry. Comparing the Mach-Zender geometry of FIG. 16 (called Mach-Zender because of its similarity to the geometry of a Mach-Zender interferometer) with the Michelson geometry, it can be appreciated that the focusing lens (objective lens 1635 in FIG. 16) can be much closer to the object 1640 because through-the-lens illumination allows the beamsplitter 1630 used for illumination to be behind the objective lens 1635 rather than between the objective lens 1635 and the object 1640. This allows large numerical aperture, high magnification objectives to be used to look at (and record holograms of) small objects. For large objects the original Michelson geometry may be preferable, depending on the situation.

It can also be appreciated from FIG. 16 that the final beam-combiner 1650 is located just before the CCD camera 1655. The final beam combiner 1650 combines the reference and object beams 1685, 1620 to illuminate the digital CCD camera 1655. The angle of the beam combiner may be varied so that the reference and object beams are exactly co-linear, or in general strike the charged coupled device camera at an angle to one another so that the heterodyne carrier fringes are produced. This allows the carrier fringe frequency to be varied from 0 to the Nyquist limit of the CCD camera. The final beam combiner 1650 is much closer to the digital camera 1655 than with the Michelson geometry, at least for magnifying geometries (geometries where the object hologram is being magnified for acquisition by the digital camera). This allows the combining angle between the object and reference beams to be relatively large without causing the spots from the reference and object beams to no longer overlap at the CCD camera. This allows much finer control over the carrier frequency fringes. It is possible to vary the angle between the two beams from zero up to the maximum angle allowed by the constraints of the system without the spatial carrier frequency of the heterodyne hologram exceeding the Nyquist frequency allowed by the CCD (i.e., the angle can be increased until there are only two CCD pixels per fringe of the spatial carrier frequency— beyond this angle the spatial carrier frequency is no longer correctly recorded by the CCD). With the Michelson geometry, the maximum spatial carrier frequency of the hologram may not be reachable because the angle required may be large enough that the reference and object beams would no longer overlap at the CCD camera for some geometries.

Figure 17:
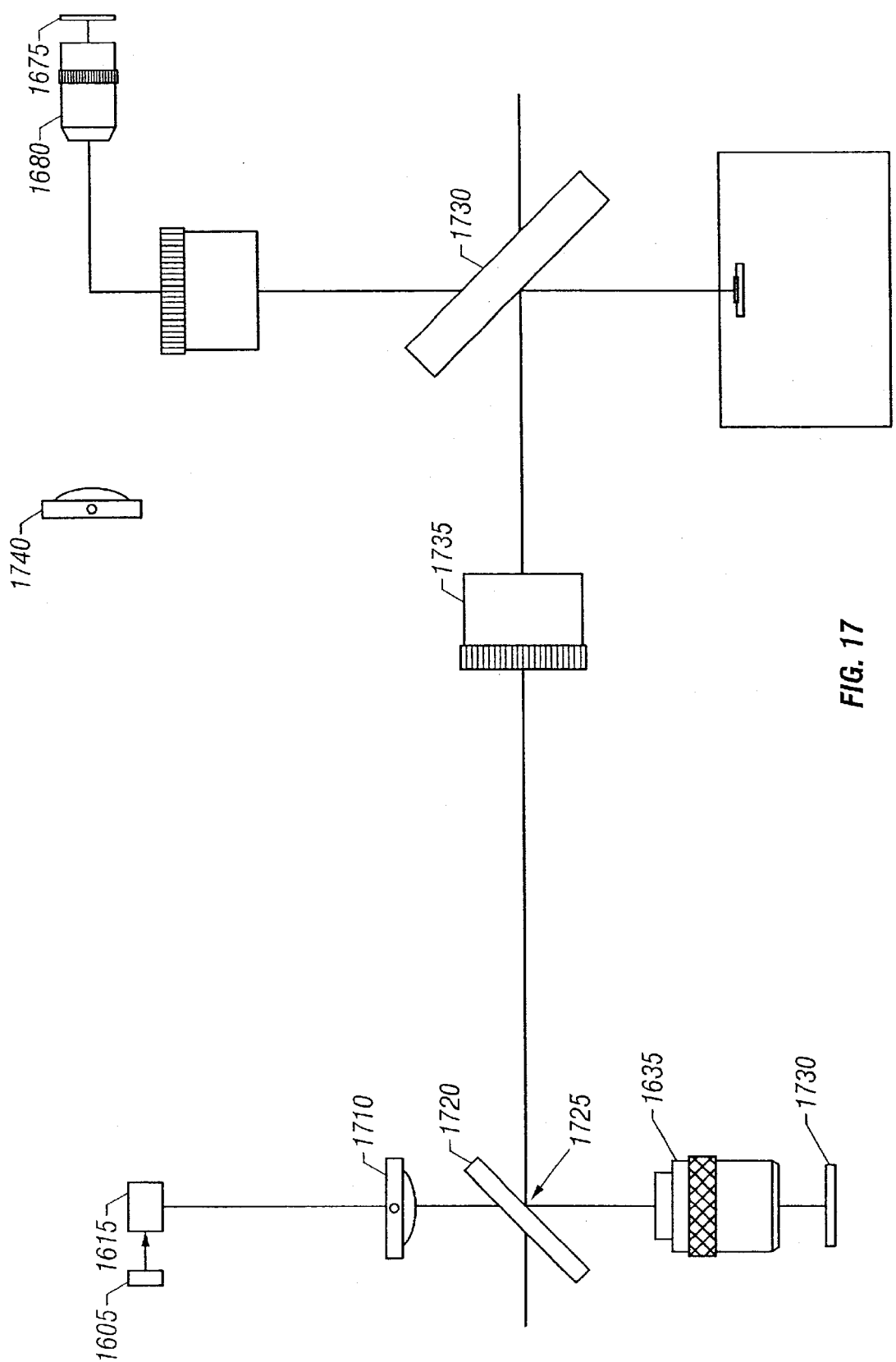
FIG. 17 illustrates a digital hologram acquisition system layout drawing illustrating an object beam reflecting off from the face of an illumination beamsplitter and beam combiner, thereby eliminating astigmatism, representing an embodiment of the invention.

Front Face Illumination of Beamsplitter/Beamcombiner for Object Beam Eliminates Astigmatism The invention can include front face reflection from beamsplitters for the object beam, thereby helping to prevent astigmatism in the image. A limitation with the layout of FIG. 16 is that the object beam passes through the illumination beamsplitter material as it travels to the CCD camera Modifying the illumination geometry so that the laser beam passes through the beamsplitter only for illumination, but the beam returning from the object is reflected from the front face of the beamsplitter can eliminate this. This geometry prevents astigmatism in the image associated with passing through the beamsplitter, and simplifies lens design for the system, which would otherwise have to account for the beamsplitter material. FIG. 17 illustrates such a geometry, with 50× objectives installed (the system is also used in this configuration with Nikon 10× and Nikon 100× objectives).

Referring to FIG. 17, a PCX lens 1710 is optically coupled to a beamsplitter 1720. A target 1730 is optically coupled to the beamsplitter 1720 via lens 1635. It can be appreciated that the object beam from the target 1730 reflects from the front face 1725 of the beamsplitter 1720 and travels to a beam combiner 1730 via tube lens 1735. It can also be appreciated that the reference beam from the reference mirror 1675 reflects from the front face of a reference beamsplitter 1740. In this example, the combined beams travel to an Apogee KX-14 camera with a Kodak KAF-1400 sensor.

Quarter-wave Plate and Polarizer Beam Isolation Suppresses Unwanted Reflections The invention can include the use of quarter-wave plate and polarizer beam isolation to suppress unwanted reflections. Experiments have shown that spurious reflections from the lens surfaces of the objective (or any other source) can be suppressed by more than an order of magnitude with a quarter-wave plate isolator design. To use this technique, the illumination beamsplitter is replaced with a polarizing beamsplitter, which passes p-polarization and reflects s-polarization and a quarter-wave plate is placed between the objective and the object. The quarter-wave plate is adjusted so that the incoming p-polarization is converted to circular polarization when it strikes the object. The return from the object passes through the quarter-wave plate once more and is converted to s-polarization. The s-polarization is now reflected from the polarizing beamsplitter and passes down the optical path to the CCD camera. Spurious reflections from the objective are now suppressed because they are still p-polarization and are not reflected by the polarizing beamsplitter. Alternative versions of this could involve just placing a polarizer in front of the tube lens and not having a polarizing beamsplitter at all. Also, the polarizing beamsplitter could pass s-polarization and reflect p-polarization. To prevent astigmatism due to the quarter-wave plate, the objective must be custom designed for the materials, position, and thickness of the quarter-wave plate. Otherwise the quarter-wave plate will cause some astigmatism or other aberrations in the object image. This technique has been tested on the system at ORNL with the quarter-wave plate and polarizer in front of the tube lens configuration, and found to suppress the unwanted objective lens reflections and other noise by more than an order of magnitude.

Figure 24A:
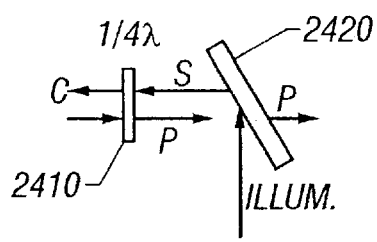
FIGS. 24A–24D illustrate polarizing beamsplitters combined with ¼ wave plates, representing embodiments of the invention.
Figure 24B:
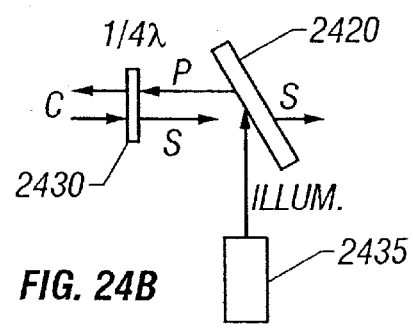

Referring to FIG. 24A, a p-pass ¼ waveplate 2410 is optically coupled to a polarizing beamsplitter 2420. Referring to FIG. 24B, an s-pass ¼ waveplate 2430 is optically coupled to the polarizing beamsplitter 2420.

Figure 24C:
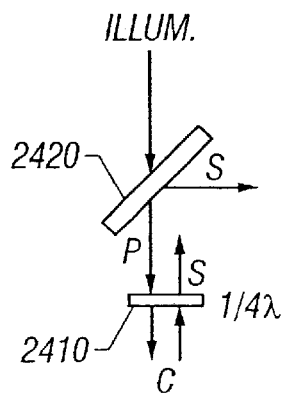
Figure 24D:
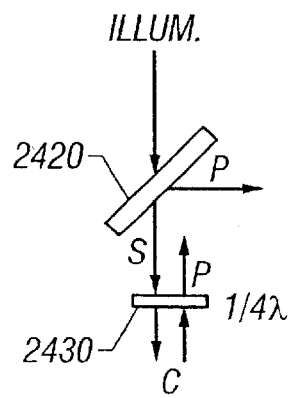

Referring to FIG. 24C, a p-pass ¼ waveplate 2410 is optically coupled to the front face of the polarizing beamsplitter 2420. Referring to FIG. 24B, the s-pass ¼ waveplate 2430 is optically coupled to the front face of the polarizing beamsplitter 2420.

Identical Object and Reference Beam Paths

The invention can include the use of identical object and reference beam paths to the maximum extent possible, thereby keeping the carrier fringe frequency constant and allowing Fourier Transform analysis. A varying carrier fringe frequency creates artifacts in the replay.

Figure 18:
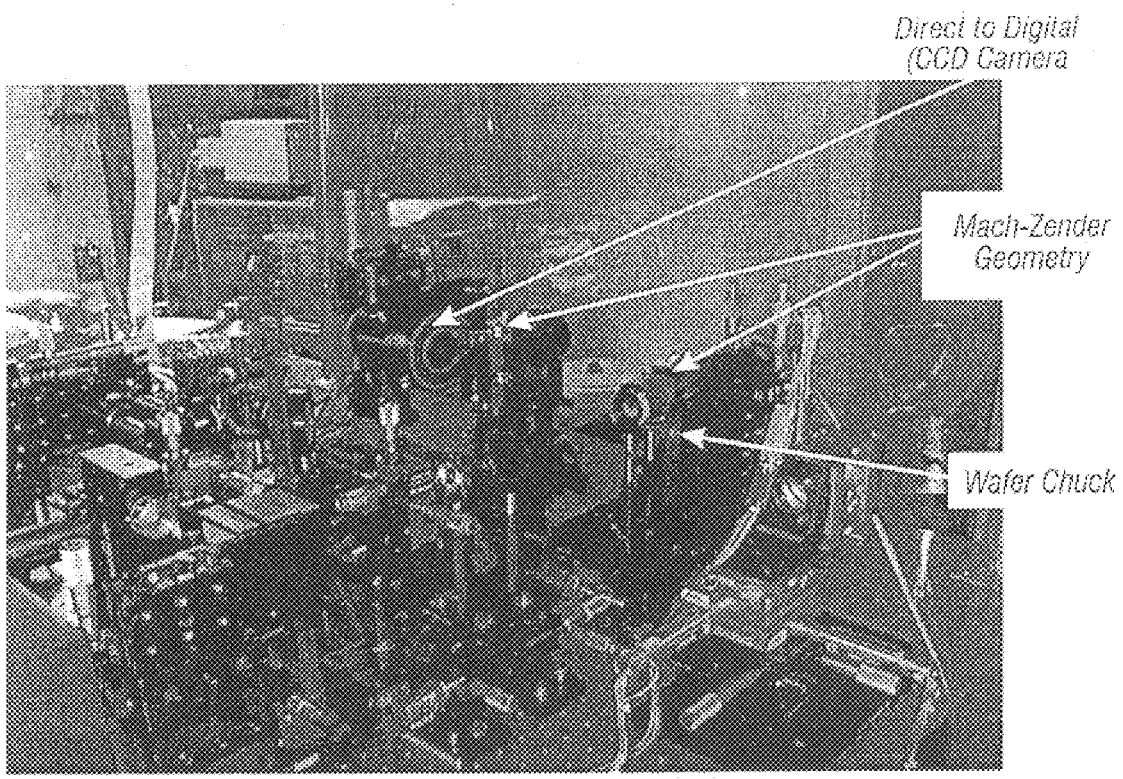
FIG. 18 illustrates a photograph of a digital hologram acquisition system, representing an embodiment of the invention.

It can be appreciated from FIG. 16 that the object and reference beam paths in this design are essentially identical. The point of this is to make the object and reference beam wave fronts as nearly identical at the digital camera (CCD sensor) as possible. The semi-identical wavefronts will interfere and produce linear carrier fringes with a constant spatial frequency. As discussed in the original invention disclosure, Fourier Transform analysis is used to eliminate the holographic spatial carrier frequency, and a digital filter is applied to leave only the object beam phase and amplitude after the inverse FFT. If the holographic carrier frequency is not constant, then this technique does not work because spurious artifacts are created in the inverse transform by the presence of the additional frequency components of the carrier frequency. Semi-identical object and reference beam paths results in a very constant spatial carrier frequency for the heterodyne hologram. An alternative method would be to exactly calculate the object beam wavefront characteristics at the digital camera and use simpler optics designed to reproduce the wavefront in the reference beam. FIG. 18 shows a photograph of the prototype system in the holography lab at ORNL, with semi-identical object and reference beam paths implemented.

Replace Mechanical Attenuator and Infinitely Variable Ratio Beamsplitters with Acousto-Optic Modulators The invention can include replacing mechanical attenuator and infinitely variable ratio beamsplitters with acousto-optic modulators. For high-speed operation, and to avoid the wear and tear associated with mechanical shutters (at the digital camera for instance), the mechanical attenuator and variable ratio beamsplitter shown in FIG. 16 can both be replaced with acousto-optic modulators. A single acousto-optic modulator could be used to replace the attenuator, and an acousto-optic modulator in each of the reference and object beam paths could be used to adjust the power in that particular path and act as a high-speed shutter. Acousto-optic modulators are usually driven with radio frequency (RF) electromagnetic waves and have an on/off time typically on the order of one microsecond. This is particularly useful for situations where images are being continuously acquired at multiple frames per second (e.g., holovision), where mechanical components cannot adjust rapidly enough and are subject to failure because of the number of cycles of operation achieved daily.

Use Fiber Optics to Couple the Laser to the Matching Lenses for Each Leg

The invention can use fiber optics to couple the laser to the matching lenses for each leg (object beam, replay beam) of the acquisition system. For example, the spatial filters could be replaced with single-mode polarization preserving fibers. A fiber optic 2435 is shown in FIG. 24B. The use of fiber optics allows the laser system and acousto-optic modulators and other beam conditioning components to be far from the acquisition system if desired, and eliminates time-consuming and finicky alignment of the micron size pinholes of the spatial filter. The single-mode optical fibers rapidly attenuate any laser light not in the allowed mode, thereby "cleaning up" the beam profile.

It can be appreciated from FIG. 16 that if mirrors and lenses are used to couple the laser to the object and reference legs of the "holocamera" that it would be inconvenient to have the laser located far from the camera system. Remote location would require unobstructed beam paths that might have to be enclosed for reasons of safety or to keep debris and artifacts out of the path and off of the optics. On the other hand if single-mode polarization-preserving optical fibers are used to couple the laser to the matching lenses for each leg, remote location of the laser is quite convenient, and the single-mode fibers also suppress all modes except the allowed propagation mode, so that the two spatial filters in FIG. 16 can both be eliminated. Remote location of the laser and acousto-optic modulators or mechanical attenuator and beamsplitter can have considerable advantages in many situations. Lasers can often be bulky and have considerable environmental requirements (cooling, electrical power, . . . ) so that remote location with a flexible connection allows the holocamera head to be light and mobile for applications where weight is important or where mobility is important.

DIGITAL HOLOGRAM REPLAY SYSTEM IMPROVEMENTS

Practical System Layout

Figure 19:
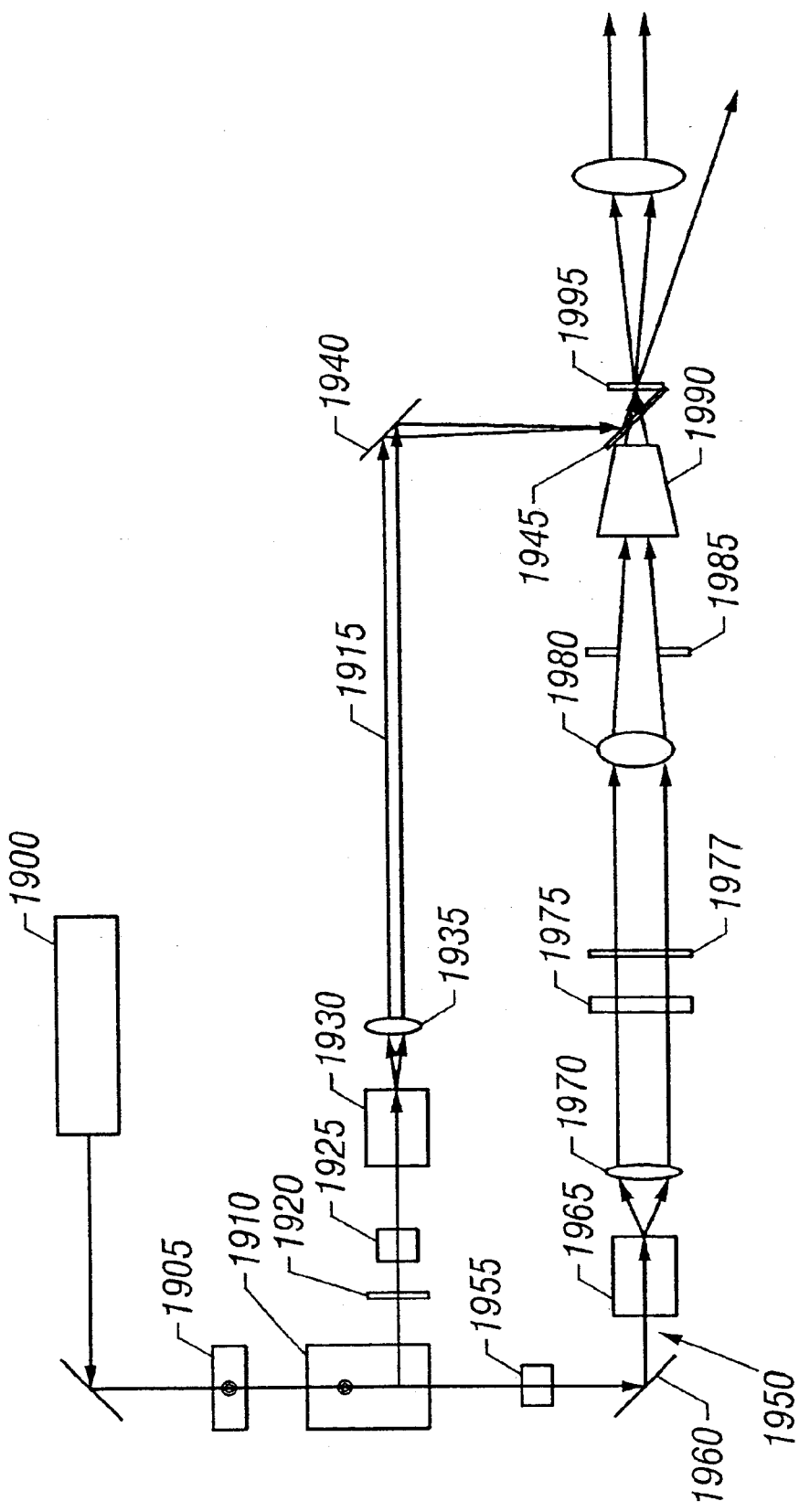
FIG. 19 illustrates a schematic of a practical replay system, representing an embodiment of the invention.

The invention can include Fourier lens filtering the SLM output to remove grating effects due to SLM pixel edges. FIG. 19 shows one practical implementation schematic of the replay system described in the original invention disclosure. A laser 1900 is optically coupled to a variable beamsplitter 1910 via a variable attenuator 1905. A write beam 1950 passes from the variable beamsplitter 1910 through a shutter 1955, to a mirror 1960, through a spatial filter 1965, and through a collimating lens 1970 to a spatial light modulator 1975. From the spatial light modulator 1975, the write beam 1950 passes through a linear polarizer 1977, through a tube lens 1980, through an aperture 1985, and through an objective lens 1990 to the beam combiner 1945, and then to a focal plane of a photorefractive crystal 1995. A replay beam 1915 passes from the variable beamsplitter 1910 through a ½ waveplate 1920, through a shutter 1925, through a spatial filter 1930, and through a collimating lens 1935 to a mirror 1940, to a beam combiner 1945 (e.g., beamsplitter), and then to a focal plane of a photorefractive crystal 1995. A set of viewing optics 1999 are optically coupled to the crystal 1995.

Still referring to FIG. 19, after being filtered and collimated to appropriate size, the write beam 1950 passes through the SLM 1975 (spatial light modulator) where it is digitally modulated (e.g., by an SLM driven by a computer) to impose the desired holographic diffraction grating pattern. The tube lens 1980 and objective 1990 then focus the holographic grating down to the appropriate size in the photorefractive crystal 1995 (lithium niobate in this case, although barium titanate and other photorefractive crystals are available). The demagnification is such that the holographic diffraction grating in the crystal 1995 will separate the zero order beam used for replay and the replayed hologram. The entire replay beam train is superfluous to the writing process. Once the holographic grating is written to the photorefractive crystal 1995 it can be replayed by closing the write beam shutter 1955 and opening the replay beam shutter 1925 so that the holographic grating written to the photorefractive crystal is illuminated by the replay beam 1915 at the correct angle to replay the hologram. Alternatively the hologram can be replayed by turning off the digital modulation to the SLM 1975 so that the write beam is now an unmodulated approximately plane wave illuminating the hologram previously written into the photorefractive crystal 1995. In this configuration the replayed hologram emerges from the crystal 1995 at the angle that the replay beam would have struck it to replay it in the write beam original direction. This is represented in FIG. 19 by the downward pointing arrow in the low right-hand corner of the drawing. In this case both the entire replay beam optics and the beamsplitter between the objective lens and the photorefractive crystal becomes extraneous and unnecessary. Thus, the holographic greeting written in the photorefractive crystal 1995 can be replayed with the replay beam, or alternatively, replayed by the write beam alone with the spatial light modulator turned off, thereby obviating the need for any replay beam or associated apparatus. For reasons of display timing one configuration or the other may be more desirable.

Figure 20:
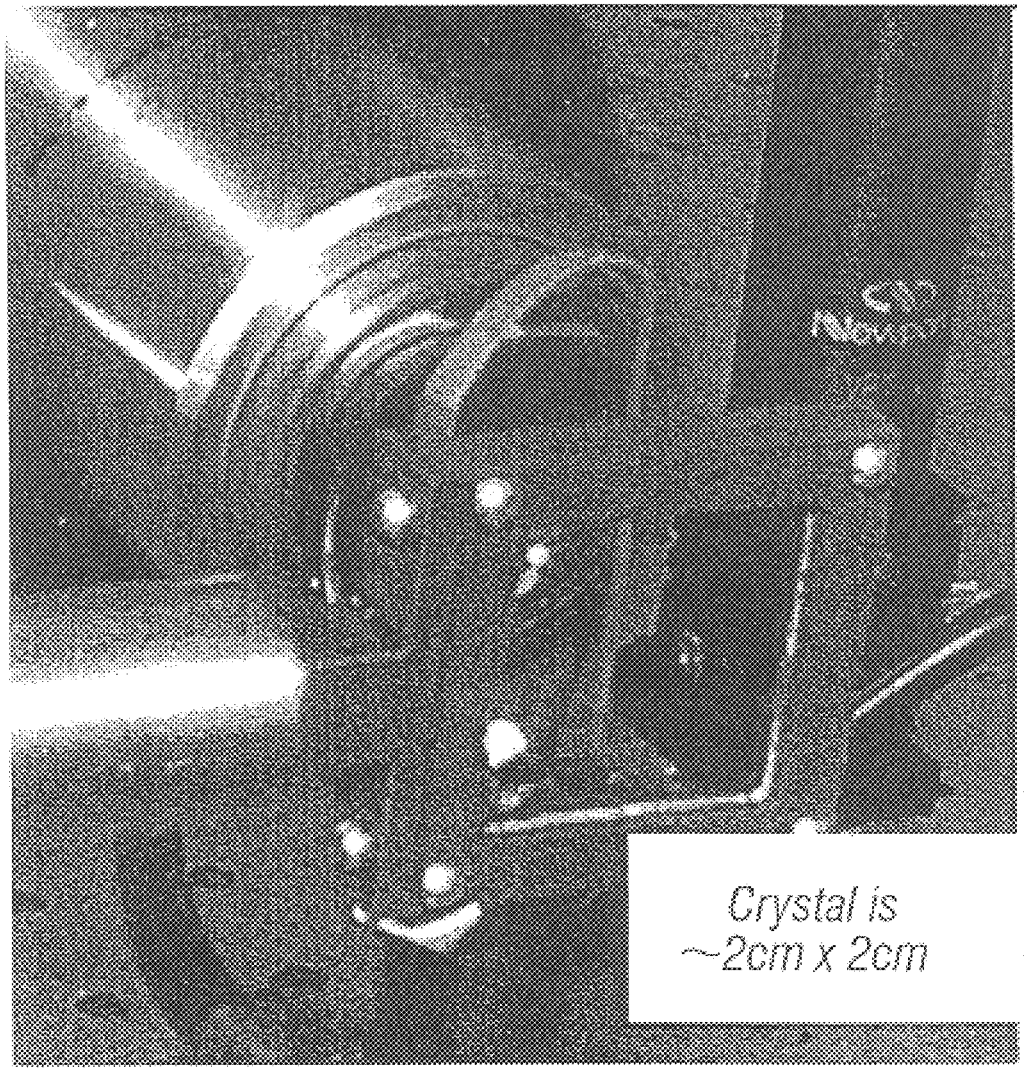
FIG. 20 illustrates a lithium niobate crystal and hologram write/replay optics, representing an embodiment of the invention.

FIG. 20 is a photograph of prototype replay system optics that was implemented in the holography lab at ORNL. There are several varieties of suitable readily commercially available SLM's, both reflective LCD (liquid crystal display), transmissive LCD, and micro-mirrors (e.g., Texas Instruments DLP—digital light processor—implementation). Typically the LCD SLM's require a polarizer.

Figure 21A:
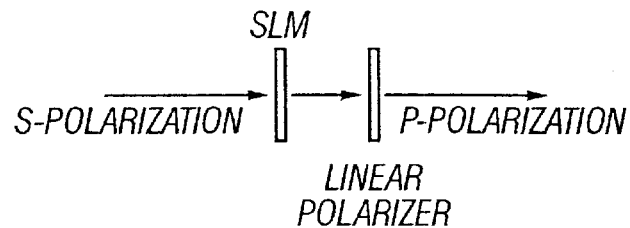
FIGS. 21A and 21B illustrate transmissive and reflective spatial light modulator optical geometries suitable for a holographic replay system, respectively, representing embodiments of the invention.
Figure 21B:
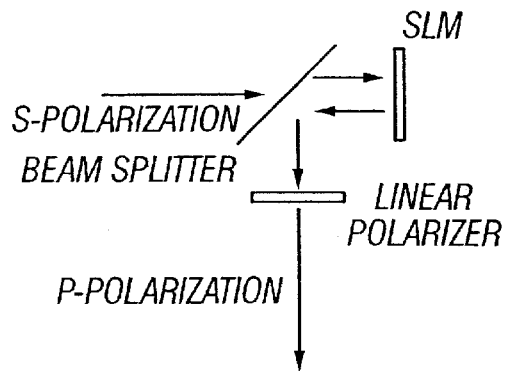
Figure 22:
FIG. 22 illustrates an 800×600 computer driven spatial light modulator followed by a polarizer as implemented in a hologram replay system, representing an embodiment of the invention.

FIGS. 21A and 21B show two SLM geometries suitable for implementation in a holographic replay system. Note that a micro-mirror implementation would not require a polarizer and would not rotate the polarization as the LCD implementations depicted do. FIG. 22 shows a photograph of the 800 pixels by 600 pixels transmissive SLM employed for the holographic replay write beam set-up shown schematically in FIG. 19.

Eliminating the SLM Pixel Edge Diffraction Grating

The invention can include writing the hologram diffraction grating to photorefractive crystal and replaying with the same beam by turning the SLM (spatial light modulator) signal on to write and off to replay. With no signal to the SLM, the write beam becomes a plane wave suitable for replay and no separate replay beam is required.

Because the SLM pixels have finite edges (as opposed to infinitely thin), the edges form a fairly strong diffraction grating. If these edges/diffraction grating are not eliminated from the image, then they form artifacts at a higher frequency in the hologram grating written to the photorefractive crystal. These artifacts are undesirable since they produce confusing diffracted orders of light and interact with the desired hologram grating to be written to the photorefractive crystal.

Figure 23:
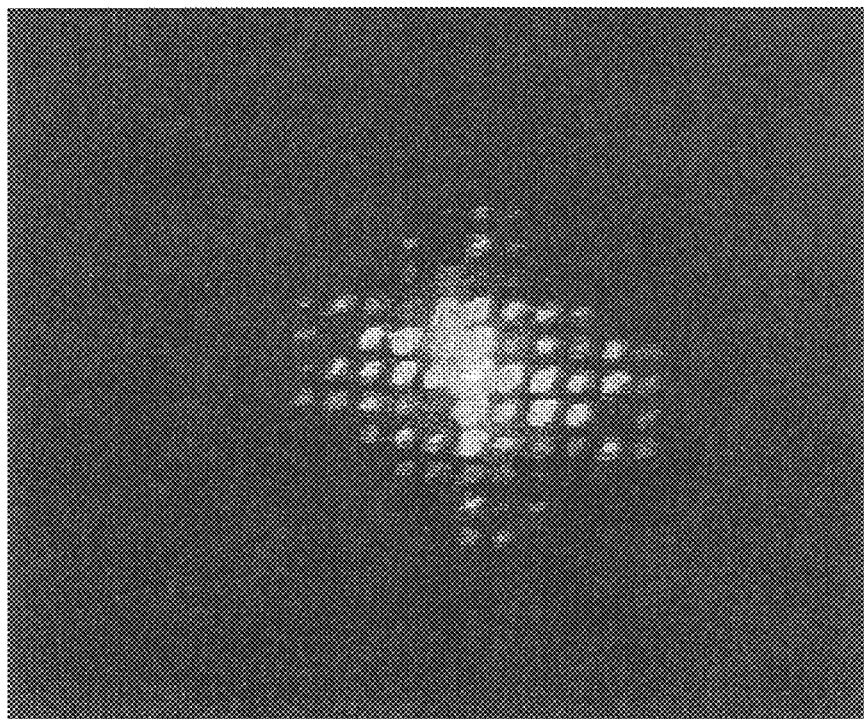
FIG. 23 illustrates a photograph of a laser beam at a Fourier plane of a tube lens showing spatial light modulator pixel edge diffracted orders (the center bright spot is the zero order diffracted image), representing an embodiment of the invention.

Referring again to FIG. 19, these pixel edges/diffraction grating can be eliminated by placing the aperture 1985 at the Fourier plane of the tube lens, which occurs between the tube lens and the focusing objective. The aperture is sized to pass only the zero diffracted order, which eliminates the pixel edges but does not eliminate the image written to the SLM, because the pixel edges are the highest frequency associated with the SLM (the pixels themselves can at most display a frequency half the pixel edge frequency, by Nyquist's Limit). The Fourier plane is easily found by turning the SLM off and observing where the diffracted orders caused by the pixel edges come to focused spots. FIG. 23 shows a photograph of the laser beam after passing through the SLM and tube lens and focusing at the tube lens Fourier plane.

Replace Attenuator, Shutters, and Spatial Filters with Acousto-Optic Modulators and Single-Mode Polarization Preserving Fibers The invention can include replacing a mechanical beam attenuator with an acousto-optic modulator for speed and convenience. More specifically, mechanical shutters can be replaced with acousto-optic modulators for speed and convenience.

As discussed above in connection with the hologram acquisition system, and for the same reasons, the attenuator, and variable beamsplitter shown in FIG. 19 can be replaced with acousto-optic modulators (AOM's). Similarly the laser and AOM's can be remotely situated from the hologram replay head ("Holovision" head) by connecting them to the replay optics with single-mode polarization preserving optical fibers. Once more this serves the purpose of eliminating mass and environmental effects (heat, vibration, ...) due to the laser and AOM's from the holovision head and makes it lightweight and mobile. The fibers also serve the purpose once more of eliminating the spatial filters shown in FIG. 19.

Many similar geometries are possible. Angles can be modified; reference and object beam geometries can be modified. Write and replay beam geometries can be modified. Specific components can be replaced with other kinds of components. Laser wavelengths used for recording and replay can be different. The system could also be implemented with coherent x-radiation, UV, DUV, VUV, or infrared coherent radiation. The replay system could be modified to use white light to replay after the photorefractive crystal is written. A phase shifting rather than amplitude modulating SLM could be used for the replay system. Ferroelectric SLM's could be used and micro mirrors (e.g., Texas Instruments DLP system) could also be used in place of an SLM.

PRACTICAL APPLICATIONS OF THE INVENTION

A practical application of the present invention which has value within the technological arts is holographic interferometry for computer assisted measurements. Further, the present invention is useful in conjunction with Holographic Television or Motion Pictures ("HoloVision") such as are used for the purpose of entertainment, or for the purpose of training, or the like. Nanovisualization and measurement in three dimensions for light wave holographic microscopy and electron holographic microscopy are expected to be major scientific applications. There are virtually innumerable uses for the present invention, all of which need not be detailed here.

The invention is useful for ultra-precision metrology. The invention is useful for 3D display and examination of technical materials and scientific data sets. The invention is useful for 3D visual news, communications, conferencing, movies, games, advertising and entertainment purposes.

ADVANTAGES OF THE INVENTION

A direct-to-digital hologram system, representing an embodiment of the invention is cost effective and advantageous for at least the following reasons. The combination of high resolution CCD, and optical techniques that reduce the density of the interference pattern (fringes) to a density that the CCD can record, combined with the Fourier transform techniques developed for interferometry and by Dr. Voelkl for electron holography, allow the electronic recording and replay of holograms.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the recordation equipment described herein is a physically separate module, it will be manifest that the recordation equipment may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. D. Gabor, Proc. Roy. Soc. London Ser. A A197, 459 (1949).
2. E. Leith and J. Upatnieks, J. Opt. Soc. Am. 52, 1123 (1962).
3. E. Leith and J. Upatnieks, J. Opt. Soc. Am. 53, 1377 (1963).
4. J. B. Develis and G. O. Reynolds, Theory and Application of Holography, Addison-Wesley, Reading, Mass., 1967.
5. L. O. Heflinger, R. F. Wuerker, and R. E. Brooks, J. Appl. Phys. 37, 642 (1966).
6. F. C. Jahoda, R. A. Jeffries, and G. A. Sawyer, Appl. Opt. 6, 1407 (1967);
7. F. C. Jahoda and R.E . Siemon, Holographic Interferometry Cookbook, LA-5058-MS Informal Report UC-37, Los Alamos Scientific Laboratory, Los Alamos, N.M., (1972).
8. M. Kujawinski, in Interferogram Analysis; Digital Fringe Pattern Measurement Techniques, (edited by D. W. Robinson and G. T. Reid), IOP Publishing Ltd., Bristol, England, 1993.
9. K. Creath and T. Kreis, in Holographic Interferometry: Principals and Methods, (edited by K. Rastogi), Springer-Verlag, New York, N.Y., 1994.

10. E. Voelkl, L. F. Allard, and B. Frost, J. Microscopy 180, pt. Oct. 1, 1995, pp. 39–50.
11. E. Voelkl, and L. F. Allard, A. Datye, B. Frost, Ultramicroscopy 58, (1995), pp. 97–103.
12. E. VoelkI and L. F. Allard, ICEM-13 (13$^{th}$ International Conference on Electron Microscopy), Jul. 17–22, 1994, Paris, France, Proceedings, p. 287.
13. The Electrical Engineering Handbook, CRC Press, (Richard C. Dorf et al. eds., 1993).
14. Handbook of Optics, Volumes I-II, 2$^{nd}$ ed., McGraw Hill Inc., (Michael Bass et al. eds., 1995).

What is claimed is:

1. An apparatus to record an off-axis hologram, comprising:
    a laser;
    an illumination beamsplitter optically coupled to said laser;
    an objective lens optically coupled to said illumination beamsplitter;
    an object optically coupled to said objective lens;
    a reference beamsplitter coupled to said laser;
    a reference mirror optically coupled to said reference beamsplitter;
    a beam combiner optically coupled to both said reference beamsplitter and said illumination beamsplitter; and
    a digital recorder optically coupled to said beam combiner,
    wherein a reference beam and an object beam are combined at a focal plane of said digital recorder to form an off-axis hologram, and said object beam and said reference beam constitute a plurality of substantially simultaneous reference and object waves.

2. The apparatus of claim 1, wherein said illumination beamsplitter, said objective lens, said object, said reference beamsplitter, said reference mirror, said beam combiner and said digital recorder define a Mach-Zender geometry.

3. The apparatus of claim 1, wherein an object beam from said object is reflected by a front face of said illumination beamsplitter and a reference beam from said reference mirror is reflected by a front face of said reference beamsplitter.

4. The apparatus of claim 1, wherein said illumination beamsplitter includes a polarizing illumination beamsplitter and said reference beamsplitter includes a polarizing reference beamsplitter, and,
    further comprising, an illuminating quarter wave plate optically coupled between said polarizing illumination beamsplitter and said object; and a reference quarter wave plate optically coupled between said polarizing reference beamsplitter and said reference mirror.

5. The apparatus of claim 1, further comprising a first polarizer optically coupled between said illumination beamsplitter and said beam combiner; and a second polarizer optically coupled between said reference beamsplitter and said beam combiner.

6. The apparatus of claim 1, wherein an object beam path is substantially identical to a reference beam path.

7. The apparatus of claim 1, further comprising an acousto-optic modulator optically coupled between said laser and both said illumination beamsplitter and said reference beamsplitter.

8. The apparatus of claim 1, further comprising a first acousto-optic modulator optically coupled between said laser and said illumination beamsplitter; and a second acousto-optic modulator optically coupled between said laser and said reference beamsplitter.

9. The apparatus of claim 1, further comprising a first optic fiber optically coupled between said laser and said illumination beamsplitter; and a second optic fiber optically coupled between said laser and said reference beamsplitter.

10. The apparatus of claim 9, wherein said first optic fiber includes a first single mode polarization preserving optic fiber and said second optic fiber includes a second single mode polarization preserving optic fiber.

11. The apparatus of claim 1, further comprising a first tube lens optically coupled between said illumination beamsplitter and said beam combiner and a second tube lens optically coupled between said reference beamsplitter and said beam combiner.

12. The apparatus of claim 1, further comprising a first beam expander/spatial filter optically coupled between said laser and said illumination beamsplitter and a second beam expander/spatial filter optically coupled between said laser and said reference beamsplitter.

13. A method of recording an off-axis hologram, comprising:
    splitting a laser beam into an object beam and a reference beam;
    reflecting said reference beam from a reference beam mirror;
    reflecting said object beam from an illumination beamsplitter;
    passing said object beam through an objective lens;
    reflecting said object beam from an object;
    focusing said reference beam and said object beam at a focal plane of a digital recorder to form an off-axis hologram;
    digitally recording said off-axis hologram; and
    transforming said off-axis hologram in accordance with a Fourier transform to obtain a set of results.

14. The method of claim 13, further comprising combining said object beam and said reference beam with a beam combiner, before digitally recording.

15. The method of claim 13, wherein i) reflecting said object beam from said illumination beamsplitter include reflecting said object beam from a front face of said illumination beamsplitter after reflecting said object beam from said object and ii) reflecting said reference beam from said reference beamsplitter includes reflecting said reference beam from a front face of said reference reflector after reflecting said reference beam from said reference mirror.

16. The method of claim 13, wherein i) reflecting said object beam from said illumination beamsplitter includes reflecting said object beam from a polarizing illumination beamsplitter and ii) reflecting said reference beam from said reference beamsplitter includes reflecting said reference beam from a polarizing reference beamsplitter, and,
    further comprising, a) passing said object beam through an illuminating quarter wave plate both before and after reflecting said object beam from said object and b) passing said reference beam through a reference quarter wave plate both before and after reflecting said reference beam from said reference mirror.

17. The method of claim 14, further comprising:
    passing said object beam through a first polarizer after reflecting said object beam from said illumination beamsplitter and before combining said object beam and said reference beam with said beam combiner; and
    passing said reference beam through a second polarizer after reflecting said reference beam from said reference beamsplitter and before combining said object beam and said reference beam with said beam combiner.

18. The method of claim 13, wherein an object beam path traced by said object beam is substantially identical to a reference beam path traced by said reference beam.

19. The method of claim 13, further comprising passing said laser beam through an acousto-optic modulator before splitting said laser beam.

20. The method of claim 13, further comprising:

passing said object beam through a first acousto-optic modulator before reflecting said object beam with said illumination beamsplitter; and passing said reference beam through a second acousto-optic modulator before reflecting said reference beam with said reference beamsplitter.

21. The method of claim 13, further comprising:

passing said object beam through a first optic fiber before reflecting said object beam with said illumination beamsplitter; and passing said reference beam through a second optic fiber before reflecting said reference beam from said reference beamsplitter.

22. The method of claim 13, further comprising:

passing said object beam through a first tube lens after reflecting said object beam from said illumination beamsplitter; and passing said object beam through a second tube lens after reflecting said reference beam from said reference beamsplitter.

23. The method of claim 13, further comprising:

passing said object beam through a first beam expander/spatial filter before reflecting said object beam with said illumination beamsplitter; and passing said reference beam through second beam expander/spatial filter before reflecting said reference beam with said reference beamsplitter.

24. The method of claim 13, further comprising storing said off-axis hologram as digital data.

25. The method of claim 13, further comprising replaying said off-axis hologram.

26. The method of claim 13, further comprising transmitting said off-axis hologram.

27. An off-axis hologram prepared by the method of claim 13.

28. The off axis-hologram of claim 27, wherein said off-axis hologram is generated using an extended Fourier transform.

* * * * *